US012512086B2

(12) United States Patent
Takeda

(10) Patent No.: US 12,512,086 B2
(45) Date of Patent: Dec. 30, 2025

(54) CONTROL DEVICE, CONTROL METHOD, AND CONTROL SYSTEM

(71) Applicant: Roland Corporation, Shizuoka (JP)

(72) Inventor: Akihiro Takeda, Shizuoka (JP)

(73) Assignee: Roland Corporation, Shizuoka (JP)

( * ) Notice: Subject to any disclaimer, the term of this patent is extended or adjusted under 35 U.S.C. 154(b) by 727 days.

(21) Appl. No.: 17/687,667

(22) Filed: Mar. 6, 2022

(65) Prior Publication Data

US 2023/0020640 A1 Jan. 19, 2023

(30) Foreign Application Priority Data

Jul. 14, 2021 (JP) ................................. 2021-116322

(51) Int. Cl.
*G10H 1/46* (2006.01)
*G10H 1/00* (2006.01)
*G10H 1/34* (2006.01)

(52) U.S. Cl.
CPC ............. *G10H 1/46* (2013.01); *G10H 1/0083* (2013.01); *G10H 1/348* (2013.01); *G10H 2220/091* (2013.01); *G10H 2240/056* (2013.01); *G10H 2240/321* (2013.01)

(58) Field of Classification Search
CPC ........ G10H 1/46; G10H 1/0083; G10H 1/348; G10H 2220/091; G10H 2240/056; G10H 2240/321
See application file for complete search history.

(56) References Cited

U.S. PATENT DOCUMENTS

2003/0121401 A1 7/2003 Ito
2013/0034240 A1 2/2013 Crawford

FOREIGN PATENT DOCUMENTS

EP 3833057 6/2021
JP 2010160180 7/2010
JP 2019184680 10/2019
WO 2018067124 4/2018
(Continued)

OTHER PUBLICATIONS

Using Boss Tone Studio for WAZA-AIR/EV-1-WL Connection Guide (https://static.roland.com/assets/media/pdf/WAZA-AIR_BTS_eng04_W.pdf, Copyright 2019, Retrieved Oct. 2, 2024) (Year: 2019).*

(Continued)

*Primary Examiner* — Jeffrey Donels
*Assistant Examiner* — Philip G Scoles
(74) *Attorney, Agent, or Firm* — JCIPRNET

(57) ABSTRACT

A pedal device receives a connection signal transmitted from headphone to establish first communication that is communication with the headphone. Then, in a case where the first communication has been established, the pedal device transmits the connection signal including information indicating that communication with the headphone has been established. By receiving the connection signal from the pedal device, a portable terminal establishes second communication that is communication with the pedal device. In a case where the received connection signal includes information that the communication with the headphone has been established, the portable terminal may determine that communication establishment between the pedal device and the headphone has been completed.

14 Claims, 17 Drawing Sheets

(56) References Cited

FOREIGN PATENT DOCUMENTS

WO 2020136892 7/2020

OTHER PUBLICATIONS

Roland Corporation, “Waza-Air,” accessed on Jul. 2021, Available at: https://static.roland.com/assets/media/ pdf/WAZA-AIR_eng04_W.pdf.

“Search Report of Europe Counterpart Application”, issued on Jul. 26, 2022, p. 1-p. 9.

* cited by examiner ( a )

( b )

( a )

( b )

(a)

(b)

(a)

(b)

CONTROL DEVICE, CONTROL METHOD, AND CONTROL SYSTEM

CROSS-REFERENCE TO RELATED APPLICATION

This application claims the priority benefit of Japanese application serial no. 2021-116322, filed on Jul. 14, 2021. The entirety of the above-mentioned patent application is hereby incorporated by reference herein and made a part of this specification.

BACKGROUND

Technical Field

The disclosure relates to a control device, a control method, and a control system.

Description of Related Art

Non-Patent Document 1 discloses a headphone used by being paired with a portable terminal. The headphone can control a volume, an amount of effect of a built-in acoustic effect, and the like through an operation on a touch panel of the paired portable terminal.

In recent years, for electronic musical instruments, there is an increasing demand to control a volume and the like not only with a control device operated by a hand such as a portable terminal but also with a control device operated by a foot such as a pedal device. However, in the headphone disclosed in Non-Patent Document 1, since only one control device can be connected through pairing, the headphone can be controlled from one control device, but the headphone cannot be controlled by a plurality of control devices.

On the other hand, the applicant has developed a pedal device that is connected to a headphone via first communication and is connected to a portable terminal via second communication different from the first communication (unknown). Specifically, the pedal device transmits a control instruction received from the portable terminal via the second communication and a control instruction input by the pedal device to the headphone via the first communication. Consequently, it is possible to control the headphone from two control devices such as the pedal device and the portable terminal.

However, since the portable terminal is connected to the headphone via the pedal device, there is a problem in that the portable terminal cannot determine whether it can actually communicate with the headphone.

PATENT DOCUMENTS

[Non-Patent Document 1] [Accessed on Jul. 8, 2021] Internet <URL:https://static.roland.com/assets/media/pdf/WAZA-AIR_jpn04_W.pdf>

SUMMARY

The disclosure has been made to solve the above problems, and provides a control device, a control method, and a control system enabling a control portion to determine whether the control device has completed establishment of communication with an electronic musical instrument at the time at which the control device is connected to the control portion.

According to the disclosure, there is provided a control device that controls an electronic musical instrument, the control device including a first communication part that performs wireless communication with the electronic musical instrument; and a second communication part that performs wireless communication with a control portion that controls the electronic musical instrument, in which, in establishment of communication with the control portion, the second communication part transmits different own information to the control portion depending on whether communication with the electronic musical instrument using the first communication part has been established.

According to the disclosure, there is provided a control method executed by a control device connected to, via wireless communication, an electronic musical instrument and a control portion that controls the electronic musical instrument, the control method including a first communication step of performing wireless communication with the electronic musical instrument; and a second communication step of performing wireless communication with the control portion that controls the electronic musical instrument, in which, in the second communication step, in establishment of communication with the control portion, different own information is transmitted to the control portion depending on whether communication with the electronic musical instrument in the first communication step has been established.

According to the disclosure, there is provided a control system including an electronic musical instrument; a control portion that controls the electronic musical instrument; and a control device connected to the electronic musical instrument and the control portion via wireless communication, in which the control device includes a first communication part that performs wireless communication with the electronic musical instrument; and a second communication part that performs wireless communication with the control portion, and in which, in establishment of communication with the control portion, the second communication part transmits different own information to the control portion depending on whether communication with the electronic musical instrument using the first communication part has been established.

is a diagram for describing a case where transmission timings of a control instruction and an update instruction overlap each other.

Figure 7:
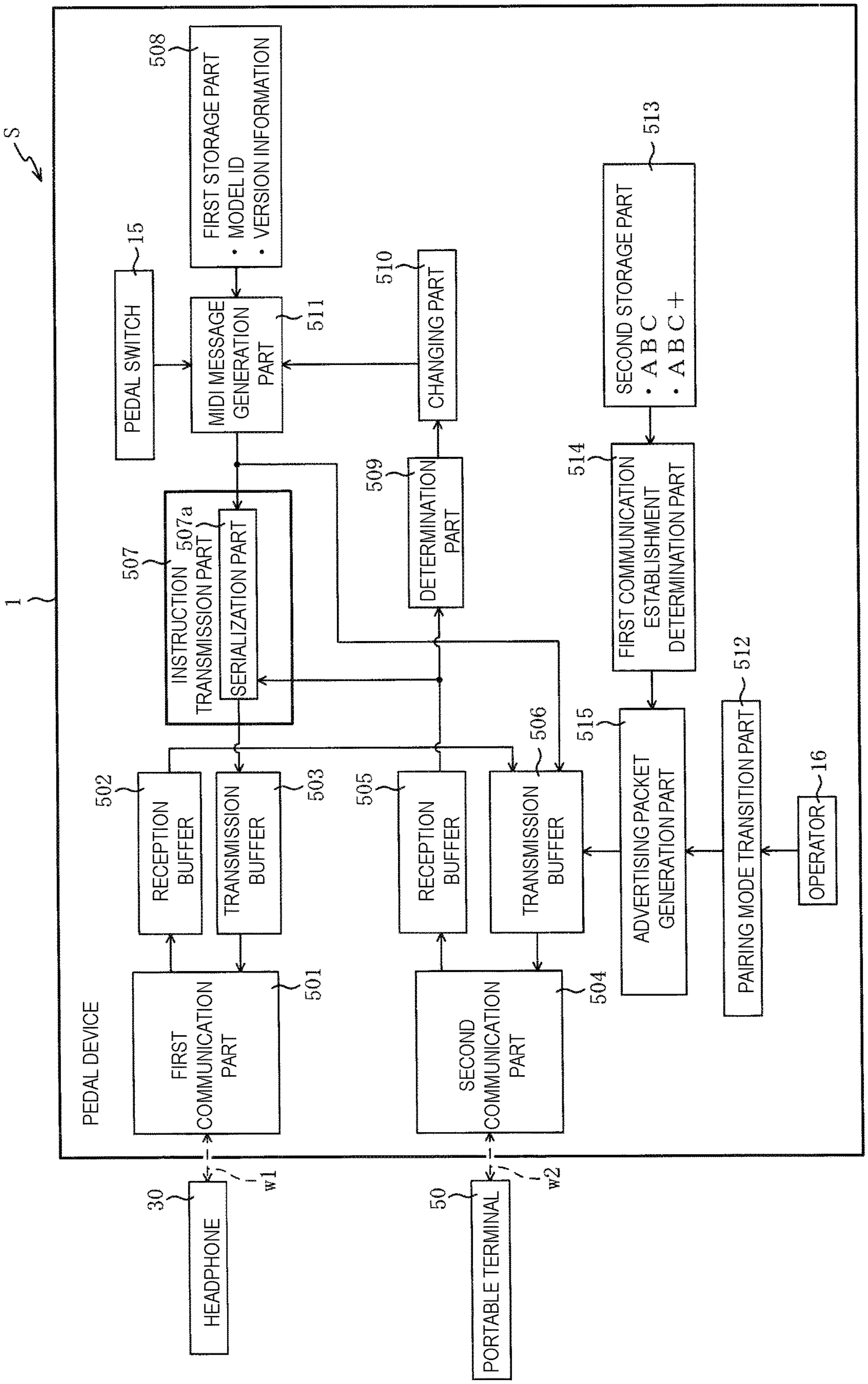

FIG. 7 is a functional block diagram of the pedal device.

Figure 8:
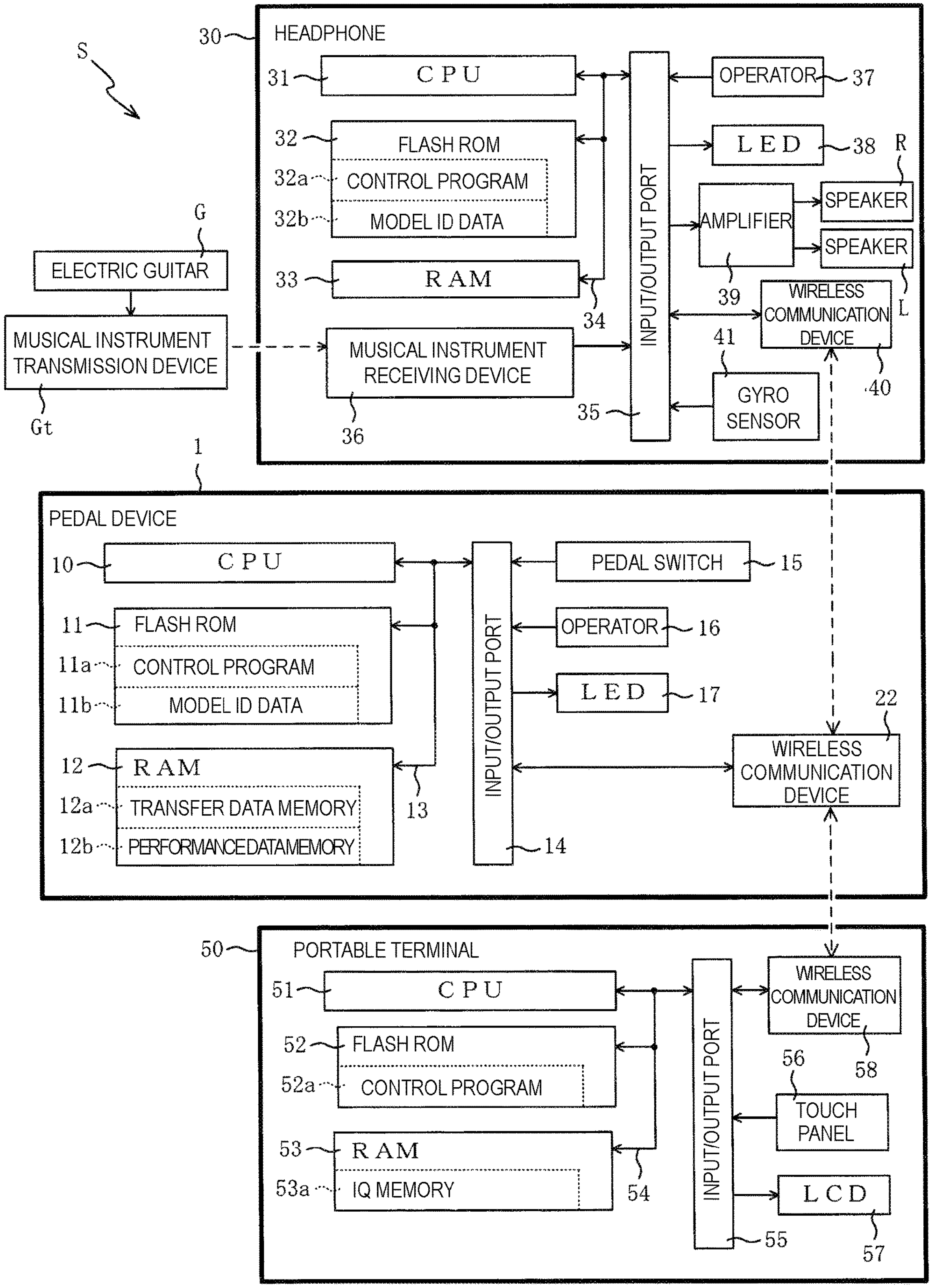

FIG. 8 is a block diagram illustrating an electrical configuration of the control system.

Figure 9:
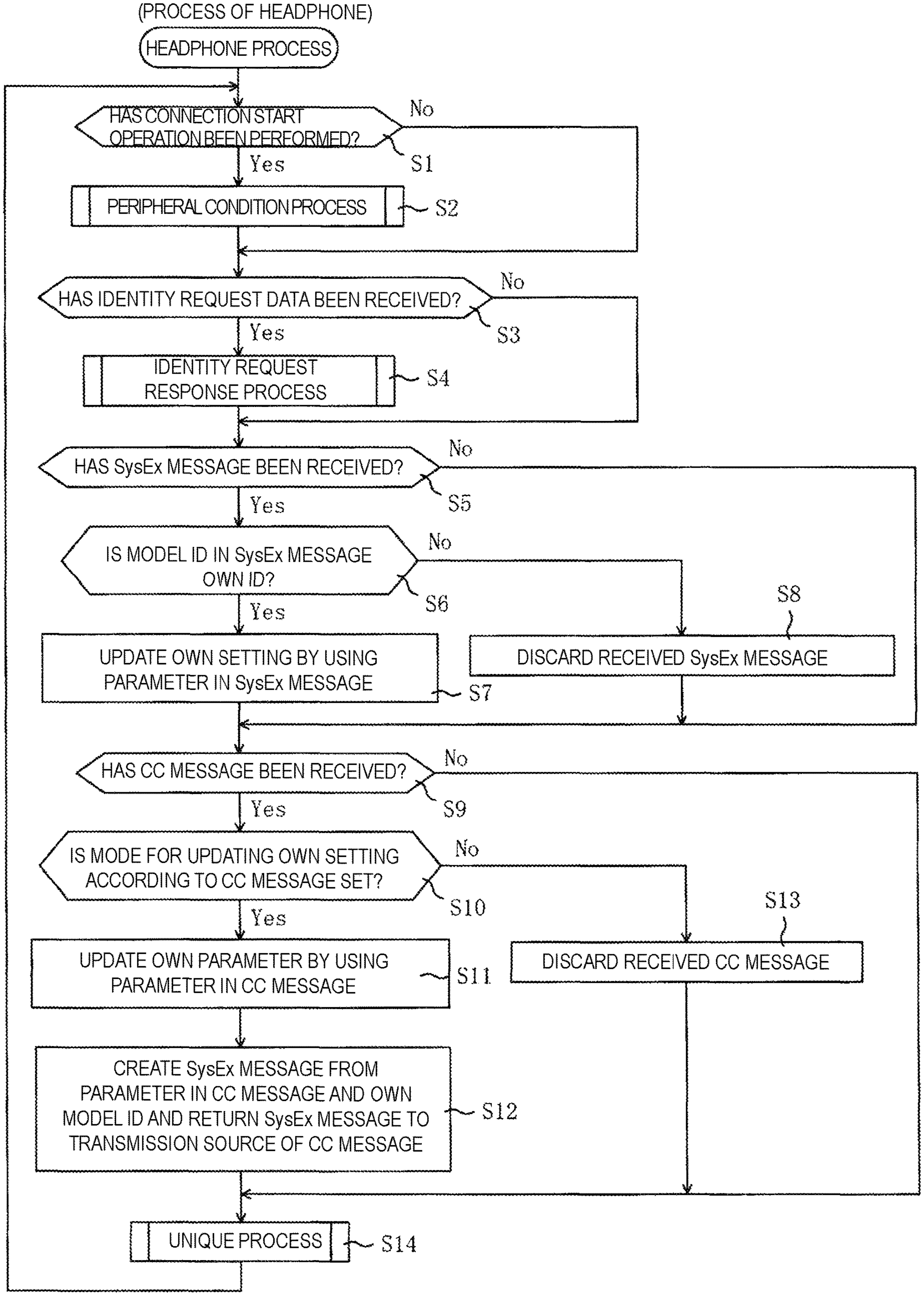

FIG. 9 is a flowchart illustrating a process of the headphone.

Figure 10:
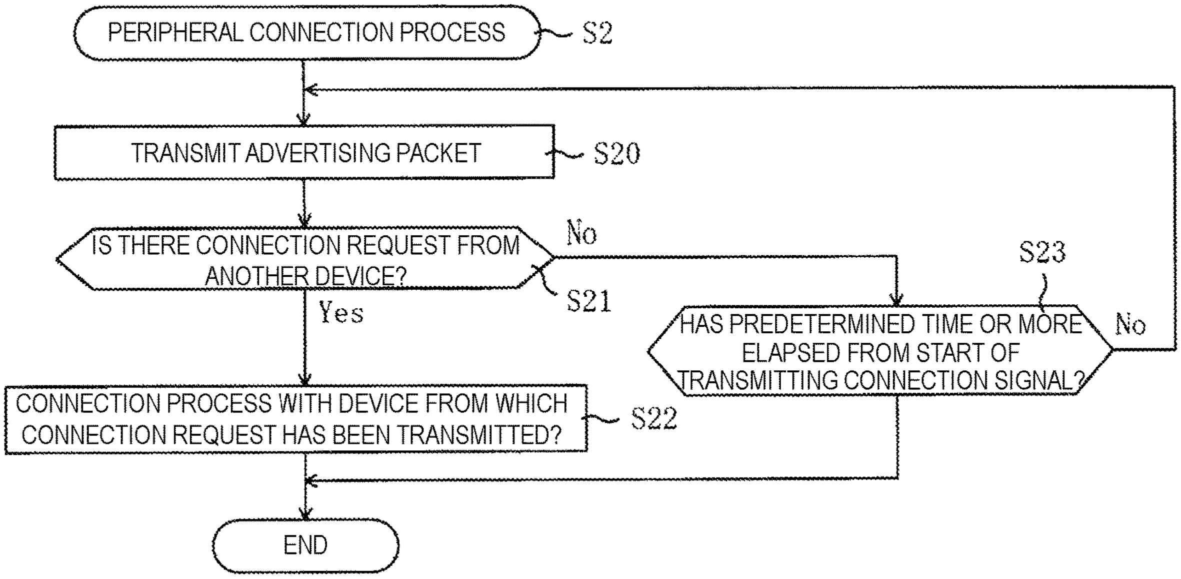
Figure 10:
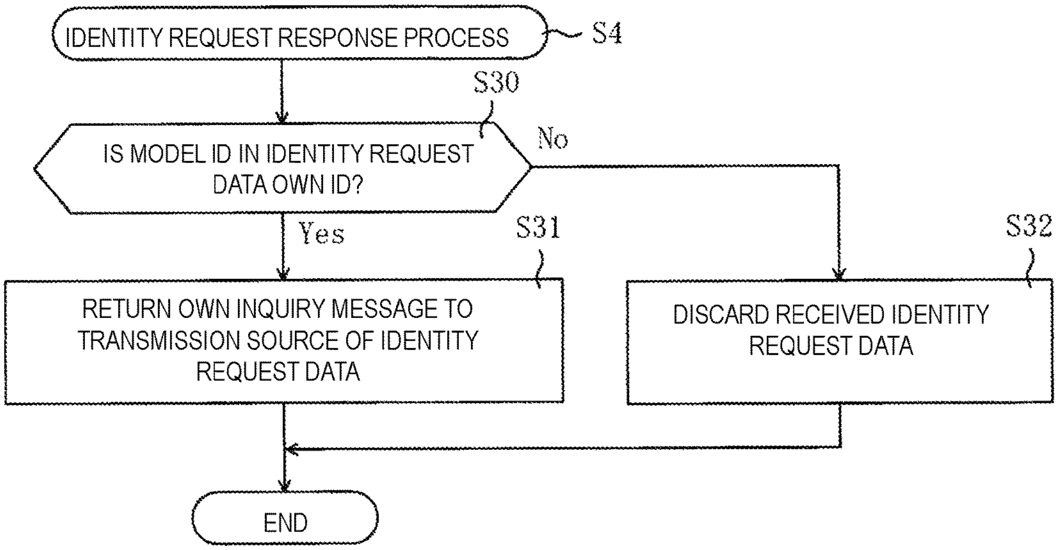

FIG. 10, (a) is a flowchart illustrating a peripheral connection process, and (b) is a flowchart illustrating an identity request response process.

Figure 11:
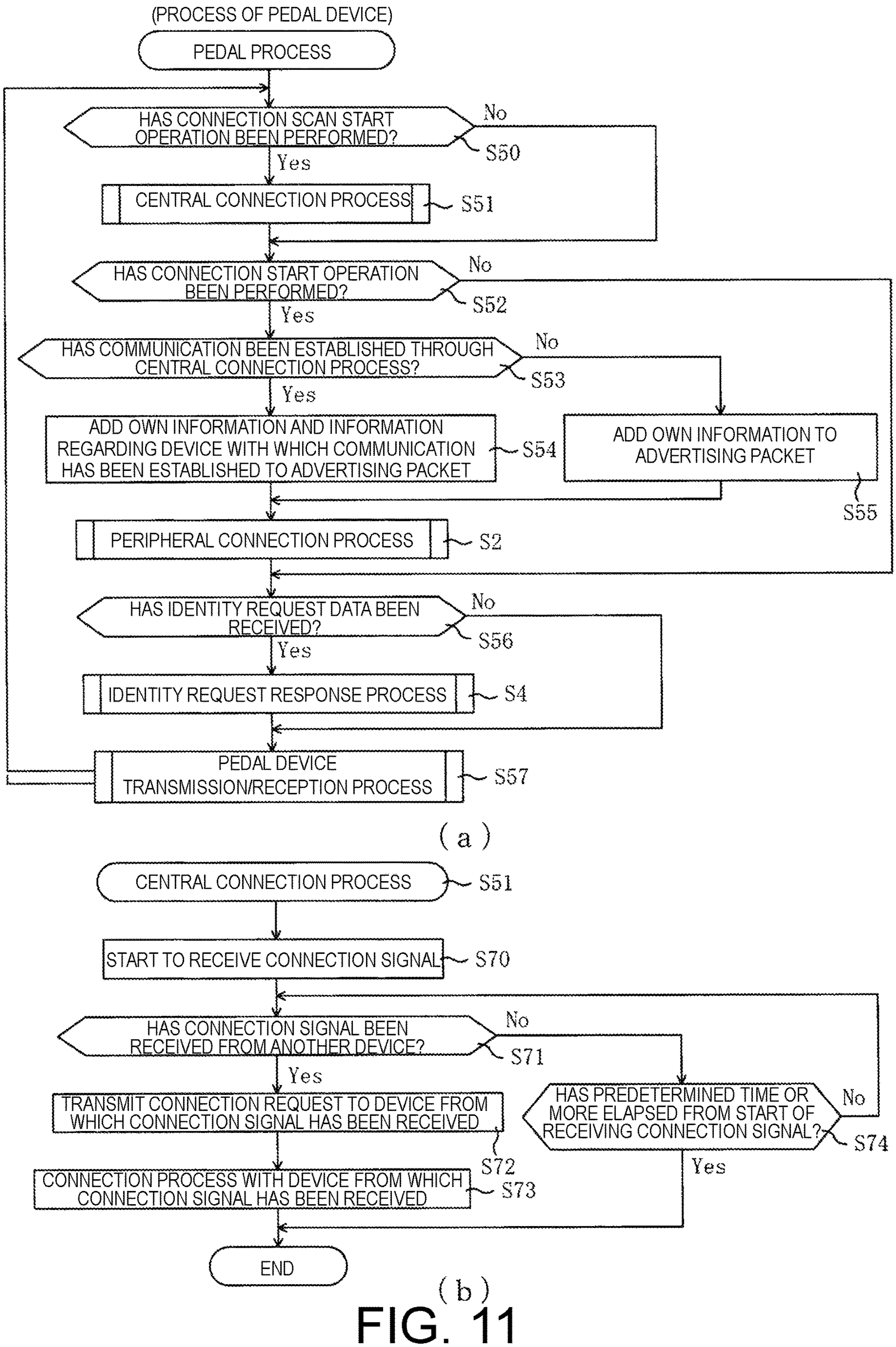

FIG. 11, (a) is a flowchart illustrating a pedal process, and (b) is a flowchart illustrating a central connection process.

Figure 12:
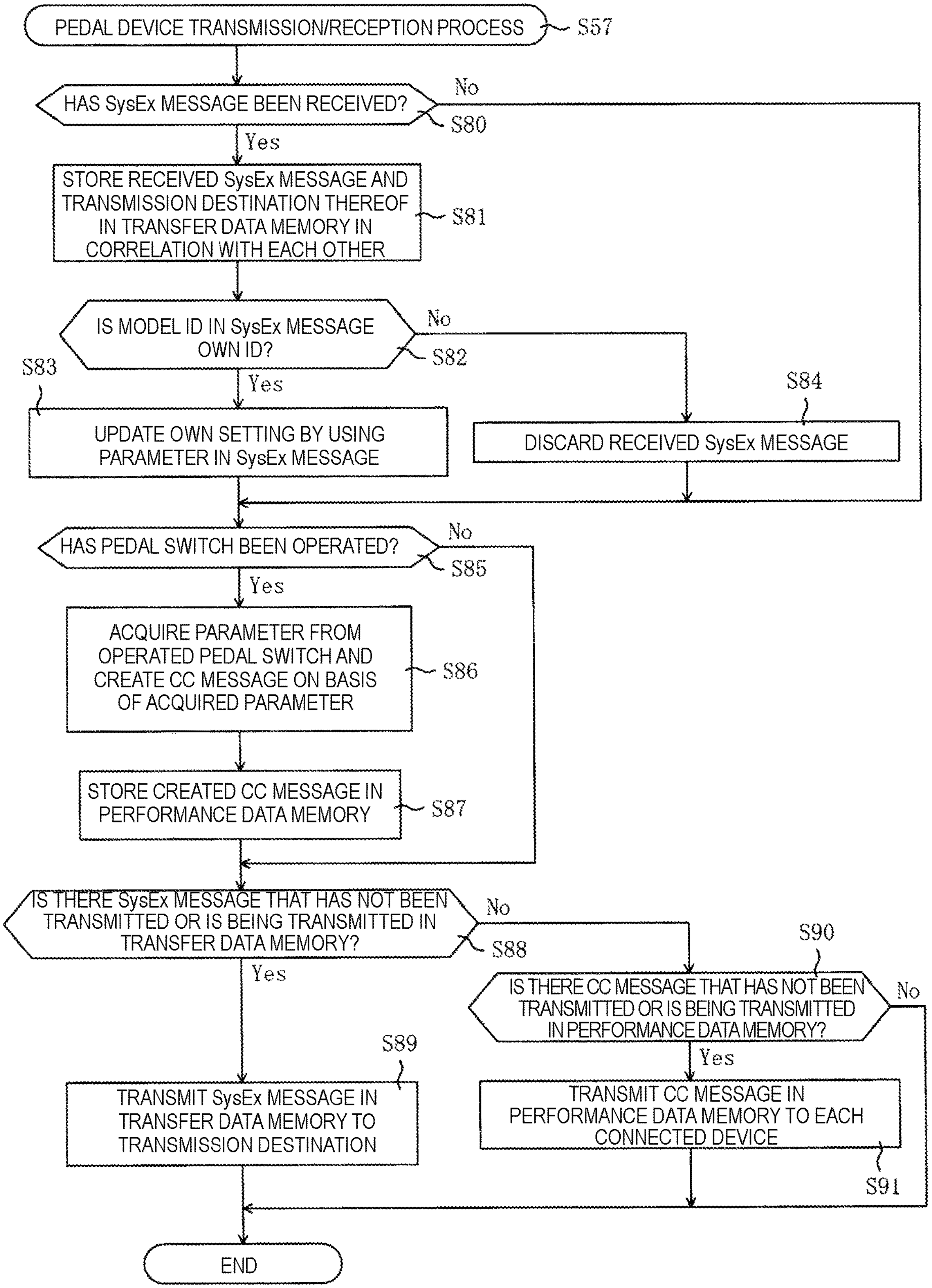

FIG. 12 is a flowchart illustrating a pedal device transmission/reception process.

Figure 13:
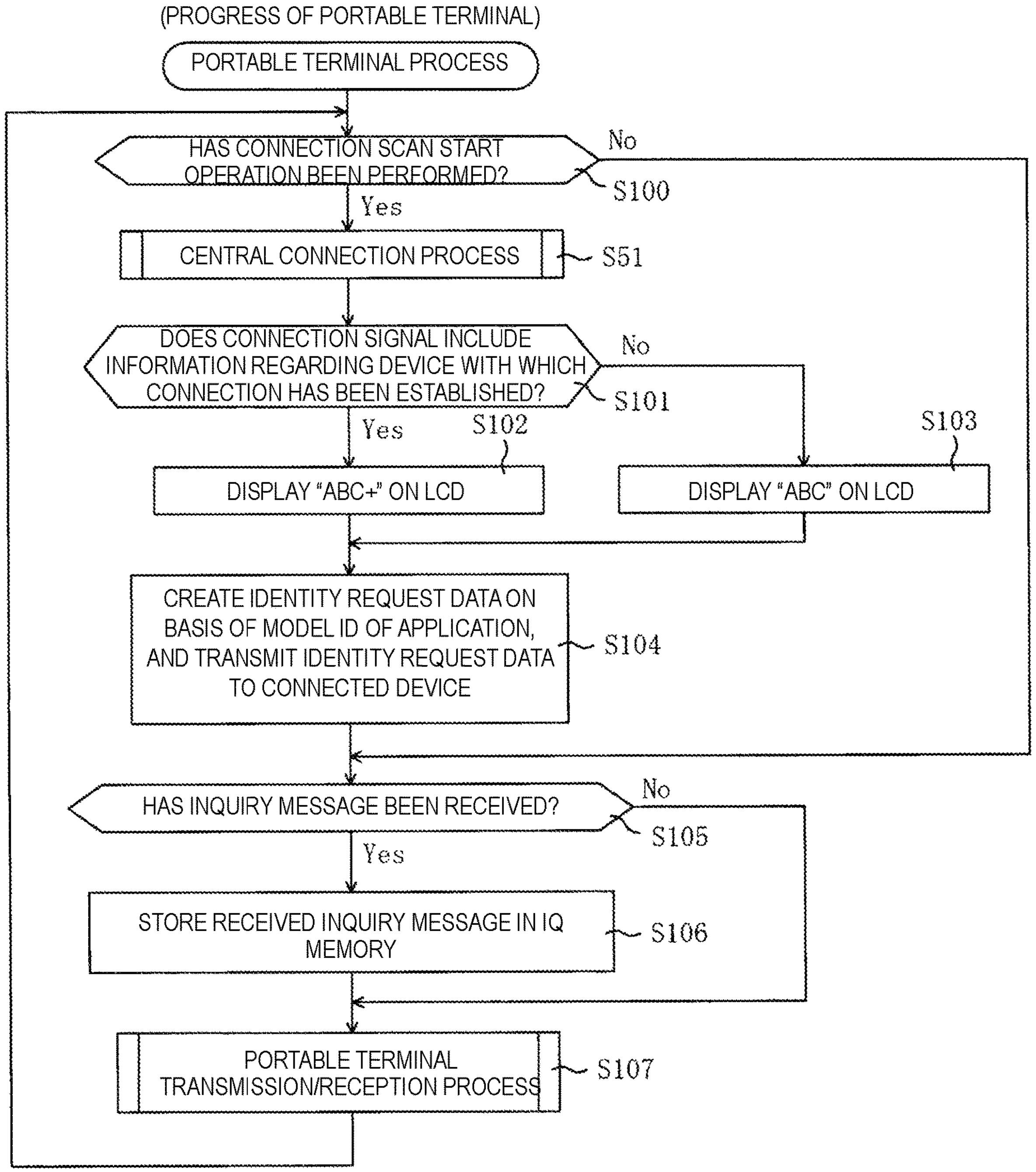

FIG. 13 is a flowchart illustrating a portable terminal process.

Figure 14:
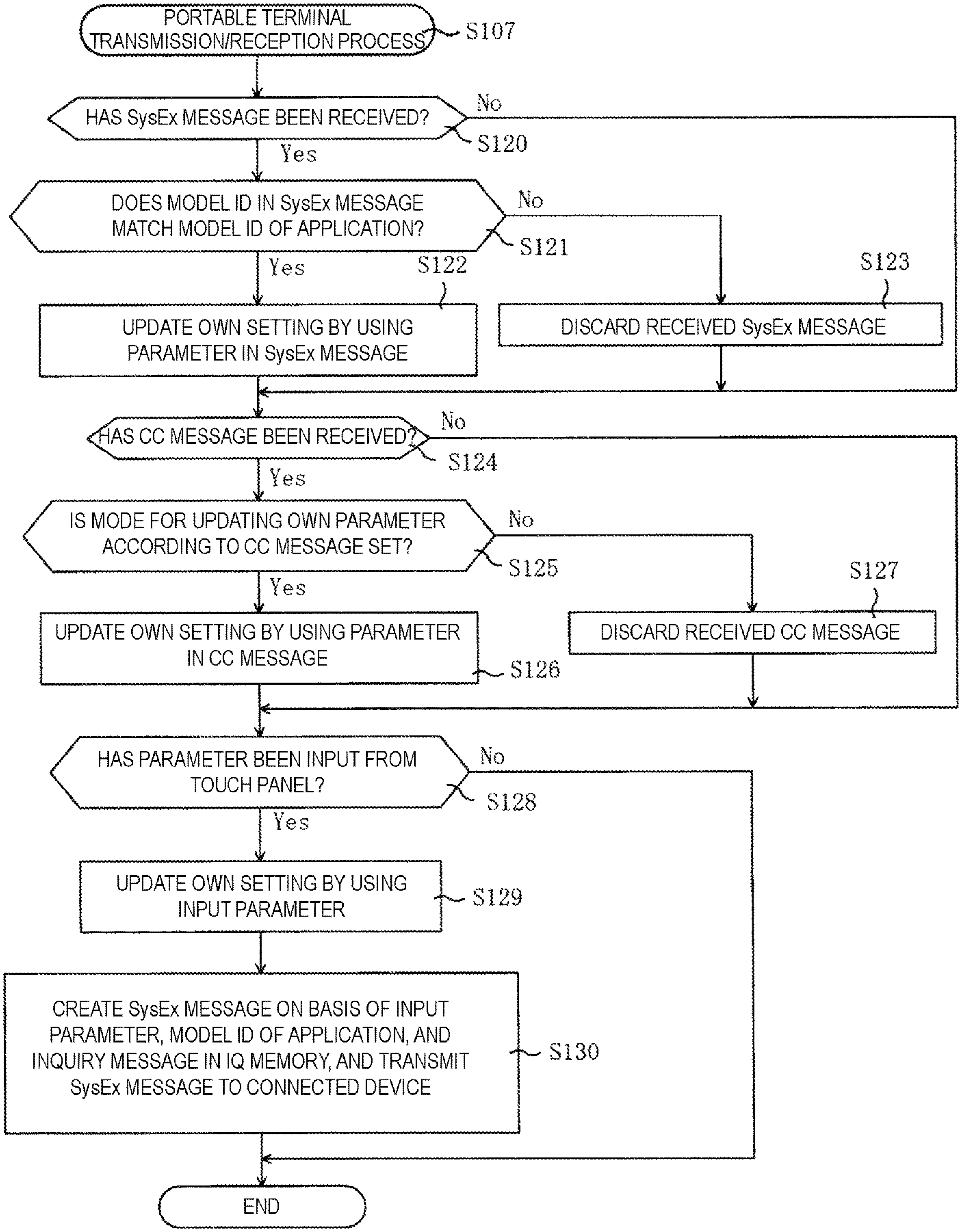

FIG. 14 is a flowchart illustrating a portable terminal transmission/reception process.

Figure 15:
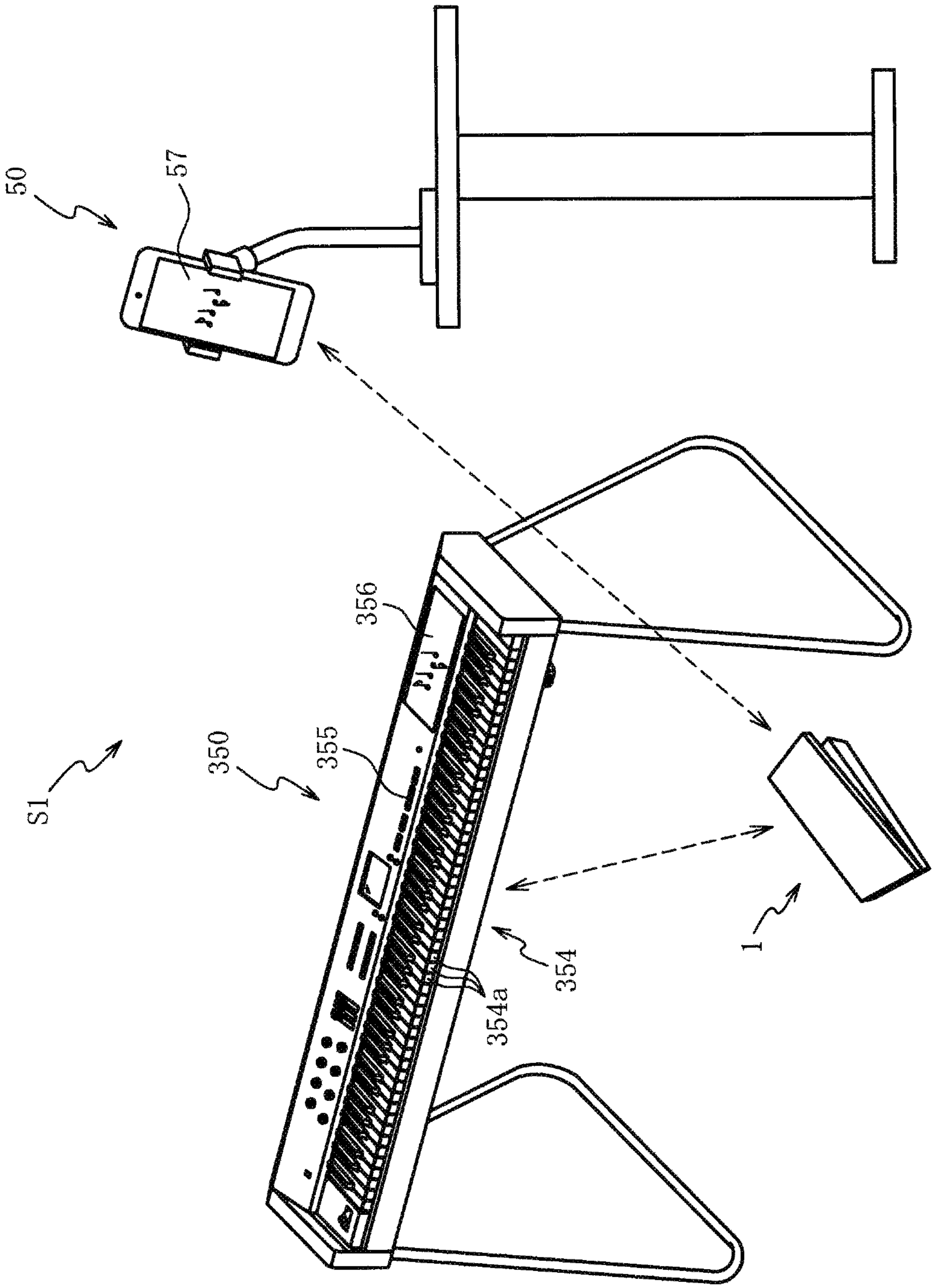

FIG. 15 is a diagram illustrating an outline of a control system in a modification example.

Figure 16:
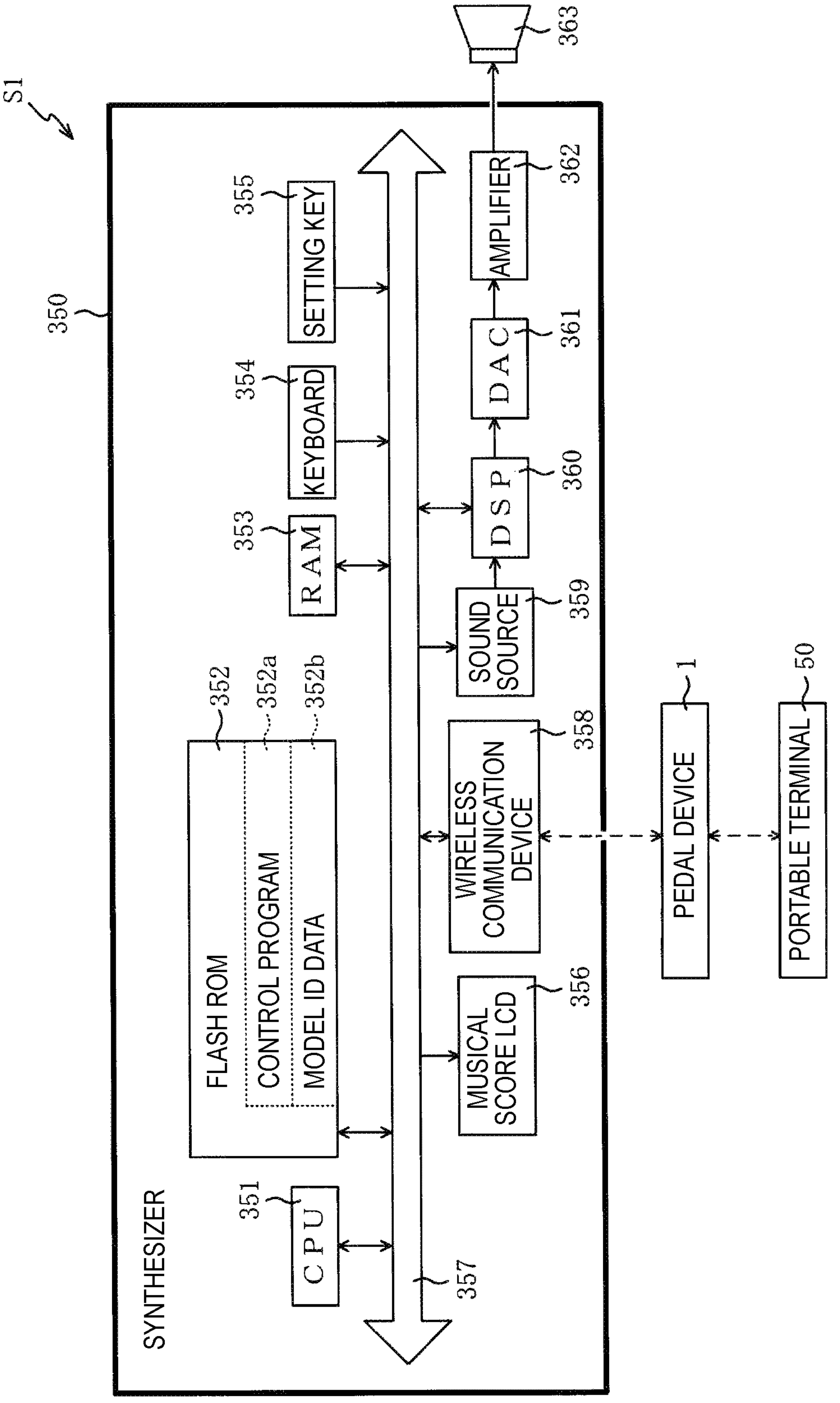

FIG. 16 is a block diagram illustrating an electrical configuration of the control system in the modification example.

Figure 17:
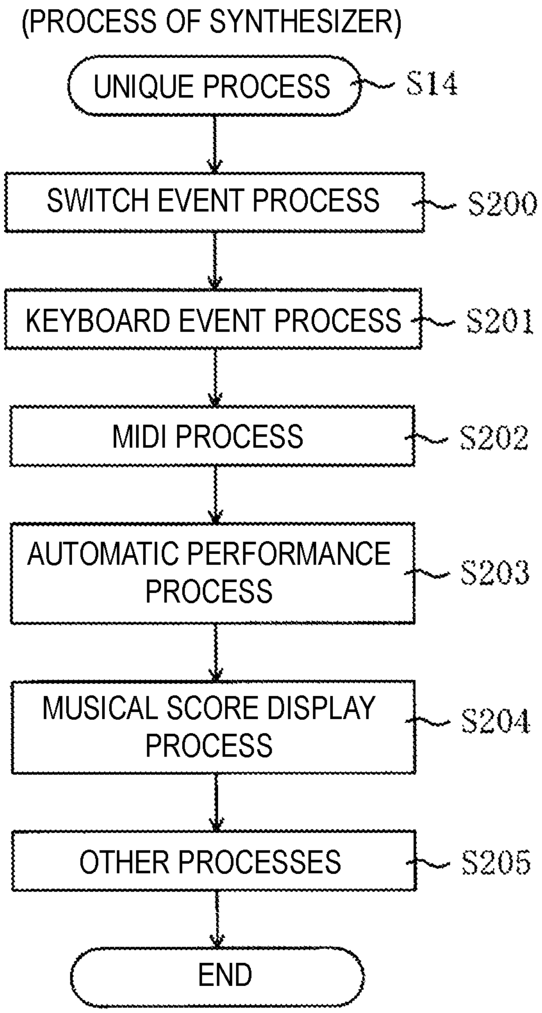

FIG. 17 is a flowchart illustrating a unique process of a synthesizer in the modification example.

DESCRIPTION OF THE EMBODIMENTS

Figure 1:
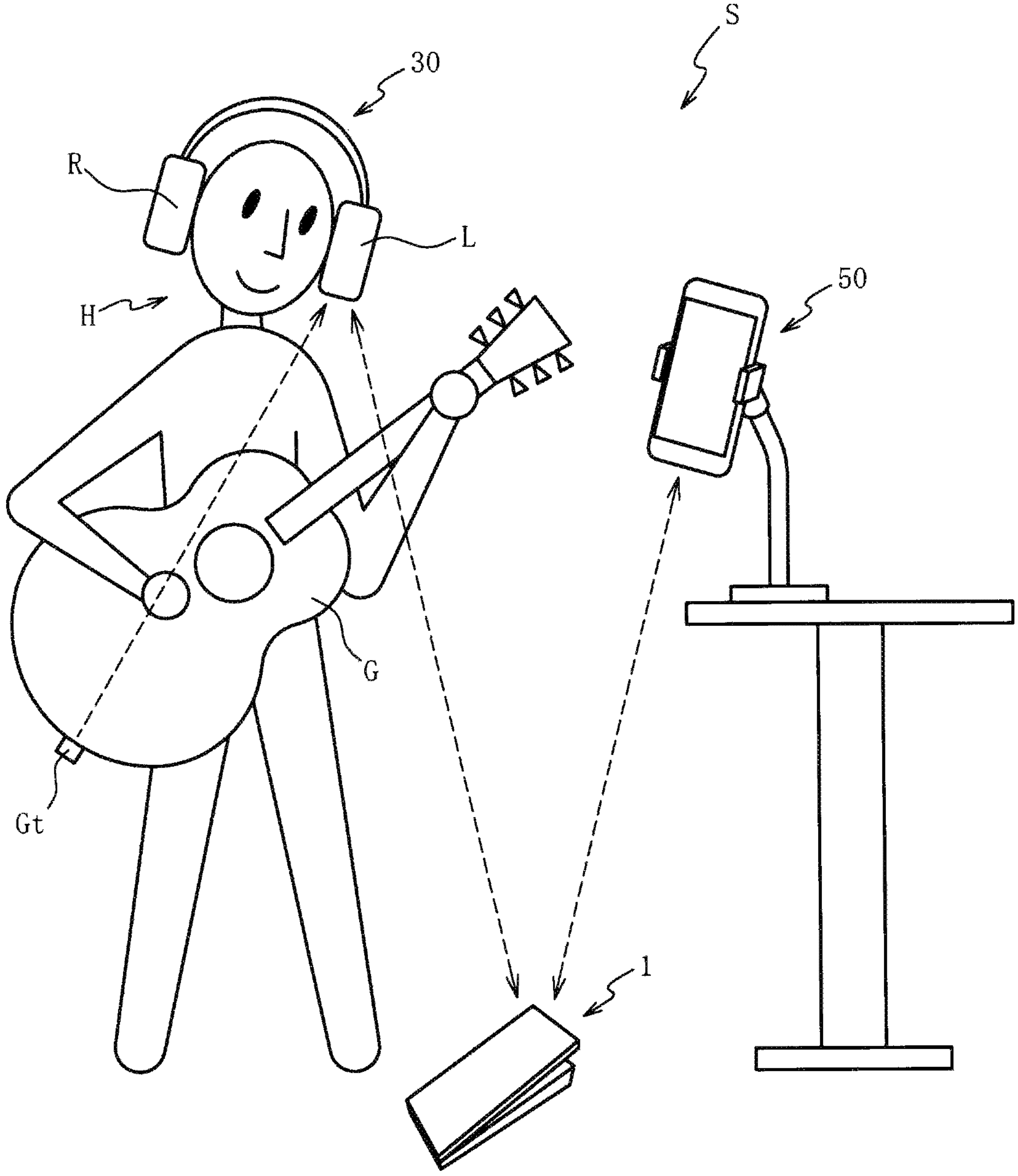
FIG. 1 is a diagram illustrating an outline of a control system.

Hereinafter, preferred embodiments will be described with reference to the accompanying drawings. An outline of a control system S of the present embodiment will be described with reference to FIG. 1. FIG. 1 is a diagram illustrating an outline of the control system S. The control system S includes a pedal device 1, a headphone 30, and a portable terminal 50. The pedal device 1 and the headphone 30 are connected via wireless communication, and the pedal device 1 and the portable terminal 50 are also connected via wireless communication.

The pedal device 1 is a device that receives operations for settings related to performance (for example, a volume and a level of acoustic effect) from a user H who performs the performance, and creates a control instruction that is information for giving an instruction for control to other devices (specifically, the headphone 30 and the portable terminal 50) on the basis of a parameter according to an operation amount and transmits the control instruction. The pedal device 1 also has a function of transmitting a control instruction transmitted from the portable terminal 50 to the headphone 30, and a function of transmitting a response to the control instruction of the portable terminal 50 transmitted from the headphone 30 to the portable terminal 50. These transmissions will be described later with reference to FIGS. 3 to 6.

The headphone 30 is an electronic musical instrument that outputs a performance sound based on playing of an electric guitar G of the user H. The electric guitar G and the headphone 30 are wirelessly connected by a musical instrument transmission device Gt connected to the electric guitar G. A performance signal output by the user H playing the electric guitar G is transmitted to the headphone 30 via the musical instrument transmission device Gt.

In the headphone 30, a performance sound corresponding to the received performance signal is output from speakers R and L. In this case, the output performance sound is configured such that an acoustic effect such as delay or distortion can be added, and the degree of the acoustic effect is changed according to a parameter from the pedal device 1 or the portable terminal 50.

The transmission of the performance signal to the headphone 30 is not limited to the electric guitar G to which the musical instrument transmission device Gt is connected, and another electric musical instrument or an electronic musical instrument such as an electronic drum or an electronic wind instrument to which the musical instrument transmission device Gt is connected may be used.

The portable terminal 50 is an information processing device (computer) that transmits control instructions to the pedal device 1 and the headphone 30 described above. A control instruction input from the portable terminal 50 is transmitted to the headphone 30 via the pedal device 1. Consequently, it is possible to control the pedal device 1 and the headphone 30 from the portable terminal 50.

Figure 2:
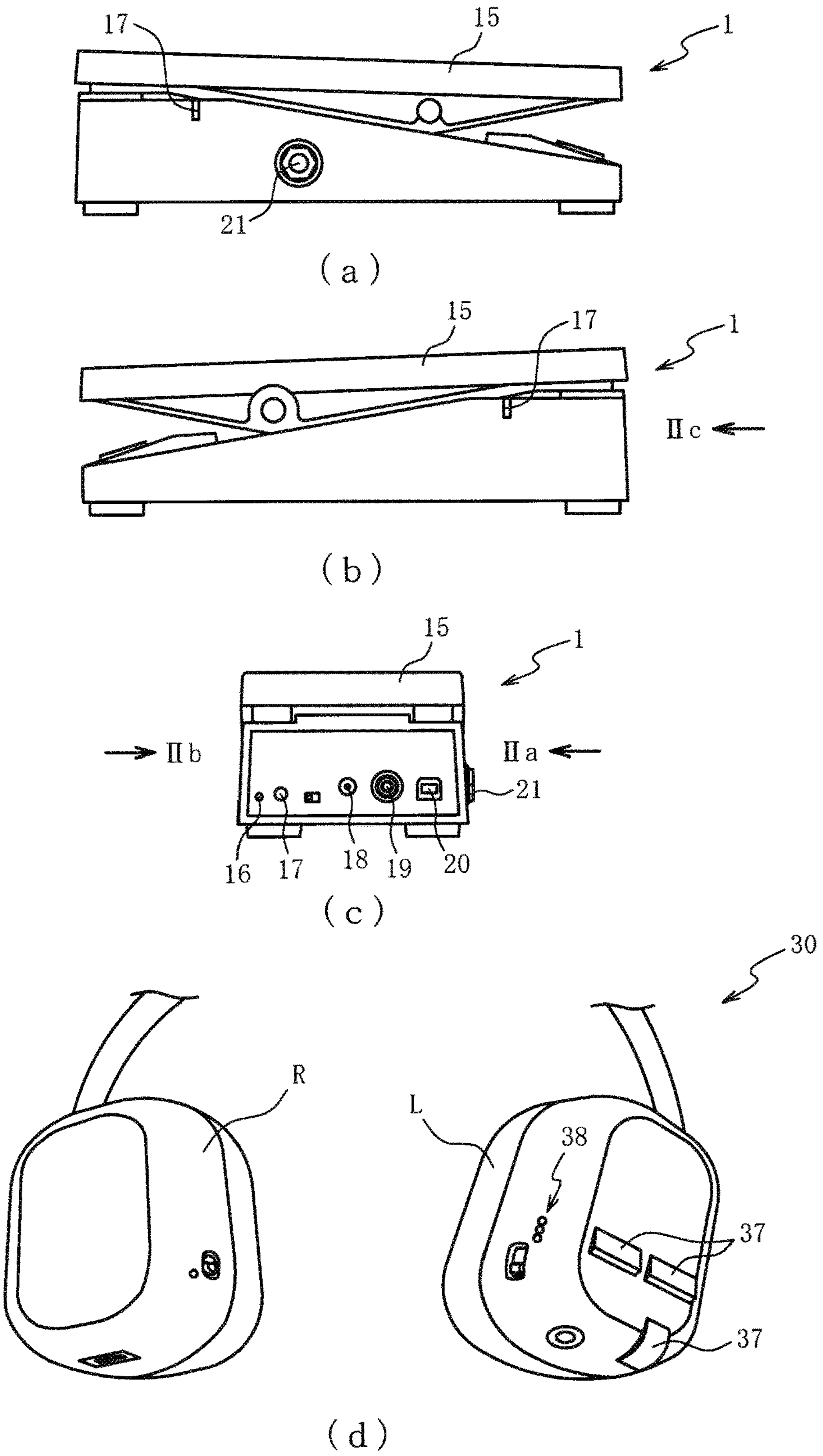
FIG. 2, (a) is a left side view of a pedal device, (b) is a right side view of the pedal device, (c) is a rear view of the pedal device, and (d) is an appearance diagram of a headphone.

Here, configurations of the pedal device 1 and the headphone 30 will be described with reference to FIG. 2. (a) of FIG. 2 is a left side view of a pedal device, (b) of FIG. 2 is a right side view of the pedal device, and (c) of FIG. 2 is a rear view of the pedal device 1. The pedal device 1 includes a pedal switch 15, an operator 16, an LED 17, a DC input terminal 18, a MIDI output terminal 19 for wired connection to an external Musical Instrument Digital Interface (MIDI) standard device, and a communication terminal 20 for wired connection to an external information processing device.

The pedal switch 15 is a device that is provided on an upper part of the pedal device 1 and detects an angle when depressed by the foot of the user H. The pedal switch 15 is configured like a "seesaw" with a predetermined position as a fulcrum, and outputs a parameter according to an angle of the pedal switch 15 that is changed when depressed by the foot of the user H. The parameter is transmitted to the headphone 30 and the portable terminal 50 via wireless communication. In the present embodiment, the pedal device 1 transmits a MIDI standard control change message (hereinafter, abbreviated to a "CC message") including parameters acquired on the basis of the pedal switch 15.

The pedal device 1 is configured such that an angle of the pedal switch 15 at which the maximum parameter is output and an angle of the pedal switch 15 at which the minimum parameter is output can be calibrated. A "number" in the CC message may be switched to a predetermined value by depressing a distal side of the pedal switch 15 (the left side in (a) of FIG. 2) with a pedaling force equal to or more than a predetermined value.

The operator 16 is an input device for inputting an instruction or the like for starting pairing with another device from the user H, and is provided on the rear surface of the pedal device 1. The LED 17 is a device that outputs a state of the pedal device 1 or a connection state with the headphone 30 and the portable terminal 50 through colors or blinking, and is provided on the left and right side surfaces and the rear surface of the pedal device 1. The DC input terminal 18 is a terminal for inputting a DC current to the pedal device 1 and is provided on the rear surface of the pedal device 1. Electric power input from the DC input terminal 18 is used as a power source for the pedal device 1. Although not illustrated, a battery is built into the pedal device 1, and in a case where a DC current is not input from the DC input terminal 18, electric power supplied from the battery is used as a power source for the pedal device 1.

Data transmitted from the pedal device 1 is not limited to the MIDI standard CC message, but may be another MIDI standard message such as a system exclusive message (hereinafter, abbreviated to a "SysEx message").

Next, the headphone 30 will be described. (d) of FIG. 2 is an appearance diagram of the headphone 30. In addition to the speakers R and L described above, the headphone 30 is provided with operators 37, and LEDs 38 that output a state of the headphone 30 or a connection state with the pedal device 1 through colors or blinking.

The operators 37 are input devices for inputting various instructions such as switching of a volume of performance sounds output by the speakers R and L from the user H or an acoustic effect added to the performance sounds, and an instruction for stating connection with the pedal device 1, and are provided in a plurality in the headphone 30. In a case where music is played by the headphone 30, the operators 37 have a function of controlling playing of the music such as playing/stopping and fast-forwarding.

Next, with reference to FIGS. 3 to 6, a procedure of establishing communication between the pedal device 1, the headphone 30, and the portable terminal 50 and transmission and reception of information will be described. First, with reference to (a) of FIG. 3, a procedure of establishing communication between the pedal device 1 and the headphone 30 will be described.

Figure 3:
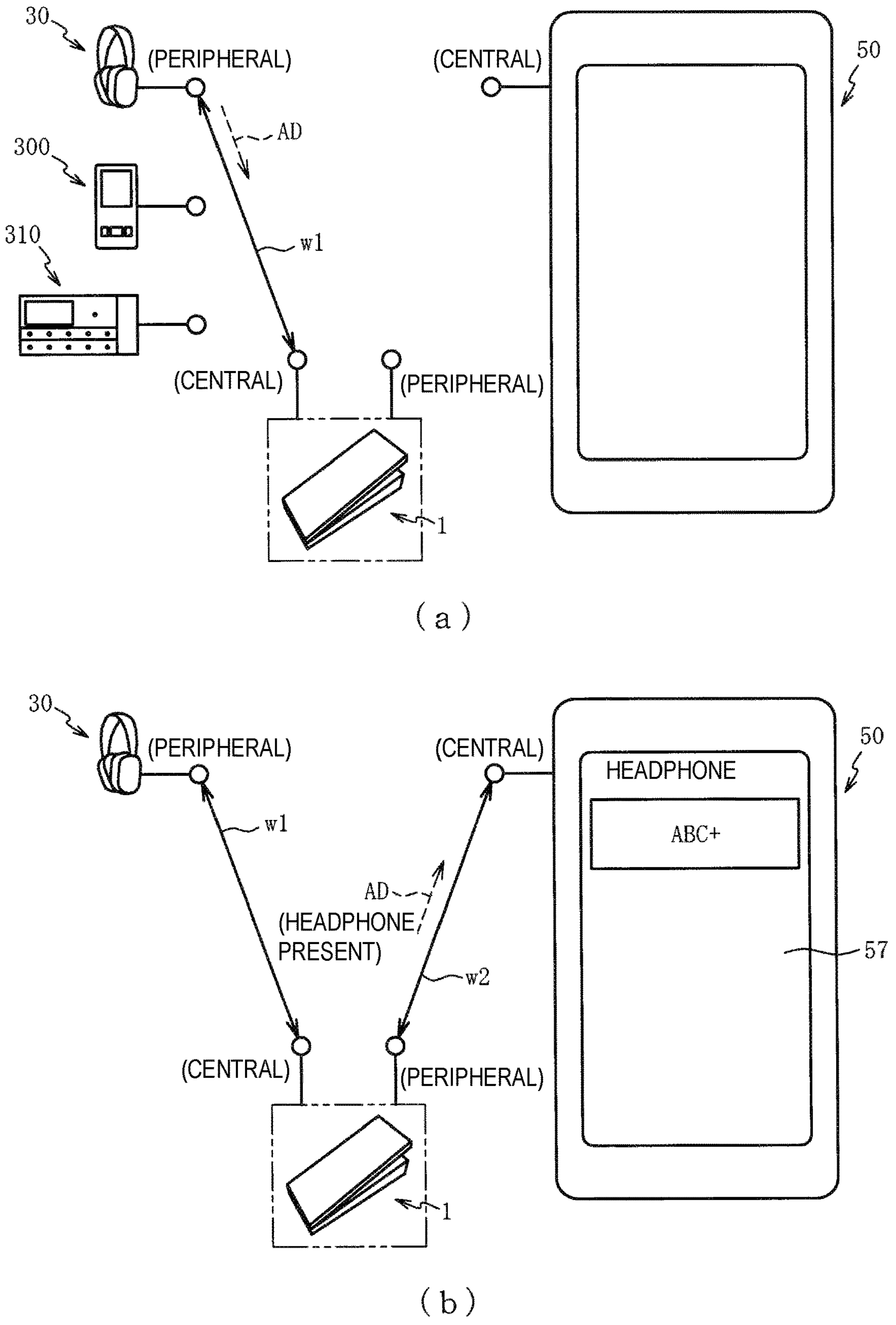
FIG. 3, (a) is a diagram for describing a procedure of establishing communication between the pedal device and the headphone, and (b) is a diagram for describing a procedure of establishing communication between the pedal device and a portable terminal.

(a) of FIG. 3 is a diagram for describing a procedure of establishing communication between the pedal device 1 and the headphone 30. A communication mode is set in communication devices such as the pedal device 1, the headphone 30, and the portable terminal 50 of the present embodiment, and communication is performed according to the set communication mode. The communication mode is provided with "central" for giving an instruction to another communication device and "peripheral" for responding to an instruction from another communication device set to central.

The portable terminal 50 of the present embodiment is set to central, and the headphone 30 are set to peripheral. The pedal device 1 uses peripheral when communicating with the central portable terminal 50, and uses central when communicating with the peripheral headphone 30. That is, the pedal device 1 is configured to be able to switch between central and peripheral depending on a communication mode of a communication partner, or to simultaneously operate in both modes.

When establishing communication with the headphone 30 and the portable terminal 50, the pedal device 1 first attempts to establish communication with the headphone 30 set to peripheral. In this case, the pedal device 1 is regarded as a central communication device, and checks whether an advertising packet AD has been received. The advertising packet AD is a signal transmitted when a peripheral communication device establishes communication with a central communication device. In a case where the advertising packet AD has been received, the pedal device 1 establishes communication with a communication device that is a transmission source of the advertising packet AD.

In (a) of FIG. 3, when the pedal device 1 receives the advertising packet AD transmitted from the headphone 30, first communication w1 that is communication with the headphone 30 is established, and the headphone 30 and the pedal device 1 are connected to and paired with each other. An operation of the user H on the pedal device 1 in this case will be described.

First, when the user H double-clicks the operator 16, a central function and a peripheral function are switched alternately (by toggle). The central function is a function in which the pedal device 1 is connected to a peripheral communication device, and the peripheral function is a function in which the pedal device 1 is connected to a central communication device. In a case where the central function is set in the pedal device 1, a lighting color of the LED 17 is white, and in a case where the central function is set, a lighting color of the LED 17 is blue.

First, the central function will be described. In a case where a function is switched to the central function by double-clicking the operator 16, a mode is switched to a "reception standby mode" for waiting for reception of the advertising packet AD transmitted from a peripheral communication device, that is, the headphone 30. In this reception standby mode, the LED 17 is white and blinks slowly.

In the reception standby mode, by single-clicking the operator 16, the mode is switched to a "scan mode" for receiving the advertising packet AD from the headphone 30. In this scan mode, the LED 17 is white and blinks quickly. In the scan mode, in a case where pairing with the headphone 30 is possible by receiving the advertising packet AD from the headphone 30, the mode is switched to a "connection completion mode". In this connection completion mode, the LED 17 lights up white. The white lighting or blinking state of the LED 17 allows the user H to ascertain a pairing state with the headphone 30.

A control instruction from the central pedal device 1 is transmitted to the headphone 30 via the first communication w1 established as described above, and a response to the control instruction is transmitted from the headphone 30 to the pedal device 1.

Establishment of the first communication w1 with the pedal device 1 is not limited to the headphone 30, and may be performed for another communication device set to peripheral, for example, a portable effector 300 in (a) of FIG. 3 or an effector 310 of a type that is placed on a floor. Each of these effectors 300 and 310 is a device connected to the electric guitar G (refer to FIG. 1) and adds an acoustic effect to a performance sound corresponding to a performance signal from the electric guitar G and outputs the performance sound.

Next, with reference to (b) of FIG. 3, a procedure of establishing communication between the pedal device 1 and the portable terminal 50 due to the peripheral function will be described. (b) of FIG. 3 is a diagram for describing a procedure of establishing communication between the pedal device 1 and the portable terminal 50. The pedal device 1 is connected to a central communication device, that is, the portable terminal 50 due to the peripheral function.

In a case where the mode is switched to the peripheral function by double-clicking the operator 16, the mode is switched to a "transmission standby mode" for waiting for transmission of the advertising packet AD to the portable terminal 50. In the transmission standby mode, the LED 17 is blue and blinks slowly.

In the transmission standby mode, by single-clicking the operator 16, the mode is switched to an "advertising mode" for transmitting the advertising packet AD to the portable terminal 50. In this advertising mode, the LED 17 is blue and blinks quickly. In the advertising mode, in a case where pairing with the portable terminal 50 having received the advertising packet AD transmitted by the pedal device 1 is possible, the mode is switched to a "connection completion mode". In this connection completion mode, the LED 17 lights up blue. The blue lighting or blinking state of the LED 17 allows the user H to ascertain a pairing state with the portable terminal 50.

A control instruction from the central portable terminal 50 is transmitted to the pedal device 1 via second communication w2 established as described above, and a response to the control instruction is transmitted from the pedal device 1 to the portable terminal 50. In the present embodiment, both the first communication w1 and the second communication w2 are performed on the basis of the Bluetooth (registered trademark) Low Energy (BLE) standard, but the first communication w1 or the second communication w2 may be performed on the basis of a communication standard other than the BLE standard.

When the second communication w2 is established, in the portable terminal 50, in a case where the advertising packet AD includes information indicating that communication with the headphone 30 has been established, it may be determined that the portable terminal 50 can perform communication with the headphone 30 via the pedal device 1. In such a case, "ABC+" is displayed on the LCD 57 of the portable terminal 50. On the other hand, when the advertising packet AD does not include the information indicating that the communication with the headphone 30 has been established, "ABC" (not illustrated) is displayed on the LCD 57.

Here, "ABC" is a name for identifying a device, and for example, a model number, a product ID, or an abbreviation thereof is employed. "ABC+" or "ABC" displayed on the LCD 57 allows the user H to determine at a glance whether the pedal device 1 has completed establishment of communication with the headphone 30.

Here, whether the portable terminal 50 and the headphone 30 are connected via the pedal device 1 can also be ascertained by checking a lighting color or a lighting or blinking state of the LED 17 of the pedal device 1. Specifically, if the pedal device 1 is attempted to be paired with the headphone 30 and it is confirmed that the pairing has been completed by the blue lighting of the LED 17, and then the pedal device 1 is attempted to be paired with the portable terminal 50 and it is confirmed that the pairing has been completed by the white lighting of the LED 17, it can be confirmed that the portable terminal 50 and the headphone 30 are connected. However, since the pedal device 1 is placed at the feet of the user H, the user H who plays the electric guitar G is required to temporarily place the electric guitar G and change his/her posture such as bending over such that the LED 17 can be visually recognized.

On the other hand, since the portable terminal 50 can be disposed at the hand of the user H, the user H can check whether the pedal device 1 has completed establishment of communication with the headphone 30 on the basis of the display of "ABC+" or "ABC" without placing the electric guitar being played and further without changing the posture. The LCD 57 on which "ABC+" or "ABC" is displayed can display more flexibly and variously than the LED 17, can thus favorably visually present, to the user H, whether the headphone 30 and the portable terminal 50 are connected.

The case where the advertising packet AD includes/does not include information indicating that communication with the headphone 30 has been established is not limited to being displayed on the LCD 57, and may be output in voice, or may be output by using another method. When the case is output in voice, in a case where the information is included, "ABC+" may be output by voice, and in a case where the information is not included, "ABC" may be output in voice.

In the portable terminal 50, of the pedal device 1 and the headphone 30, a communication device that is a control target is selectable by switching between applications. In (b) of FIG. 3, since an application for controlling the headphone 30 is executed on the portable terminal 50, "headphone" is displayed on the LCD 57. On the other hand, in a case where an application for controlling the pedal device 1 is executed on the portable terminal 50, "pedal device" (refer to (b) of FIG. 4) is displayed on the LCD 57.

As described above, after the first communication w1 and the second communication w2 can be established, the portable terminal 50 acquires an inquiry message IQ of the MIDI standard that is information regarding a communication device, such as version information of control programs 32*a* and 52*a* (refer to FIG. 8) from the communication device that is a control target. The acquisition of the inquiry message IQ will be described with reference to FIG. 4.

Figure 4:
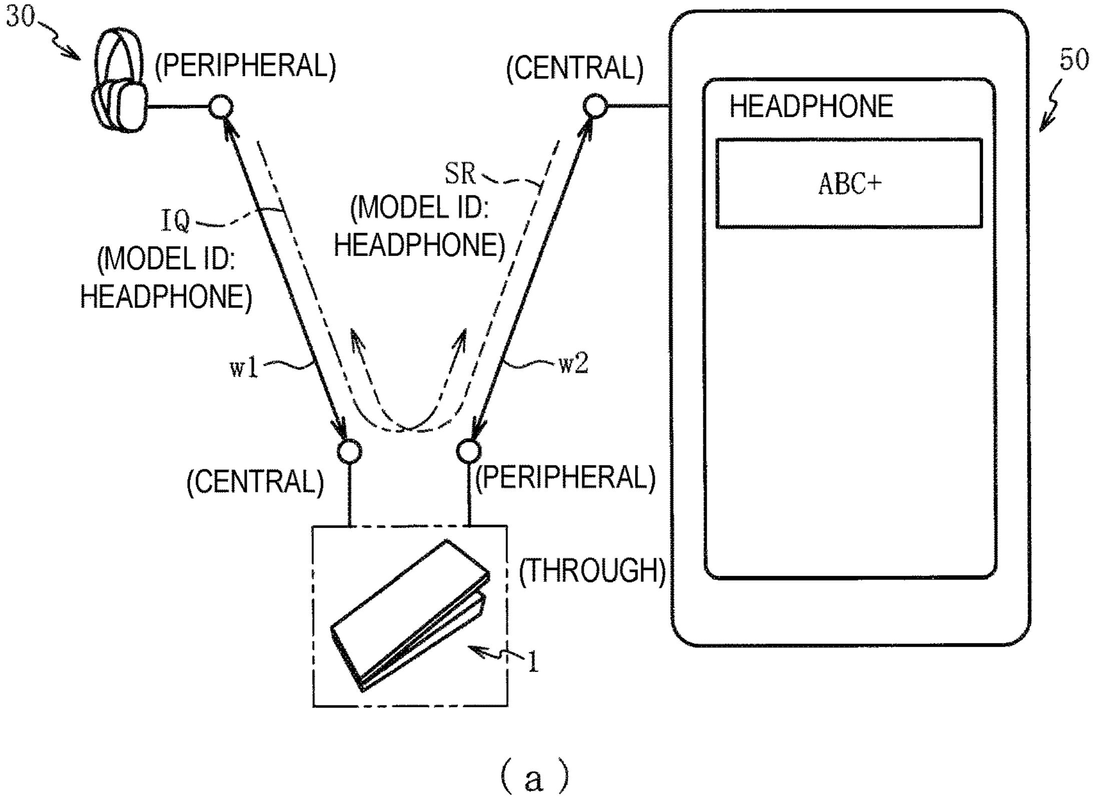
FIG. 4, (a) is a diagram for describing acquisition of an inquiry message from the headphone in the portable terminal, and (b) is a diagram for describing acquisition of an inquiry message from the pedal device in the portable terminal.
Figure 4:
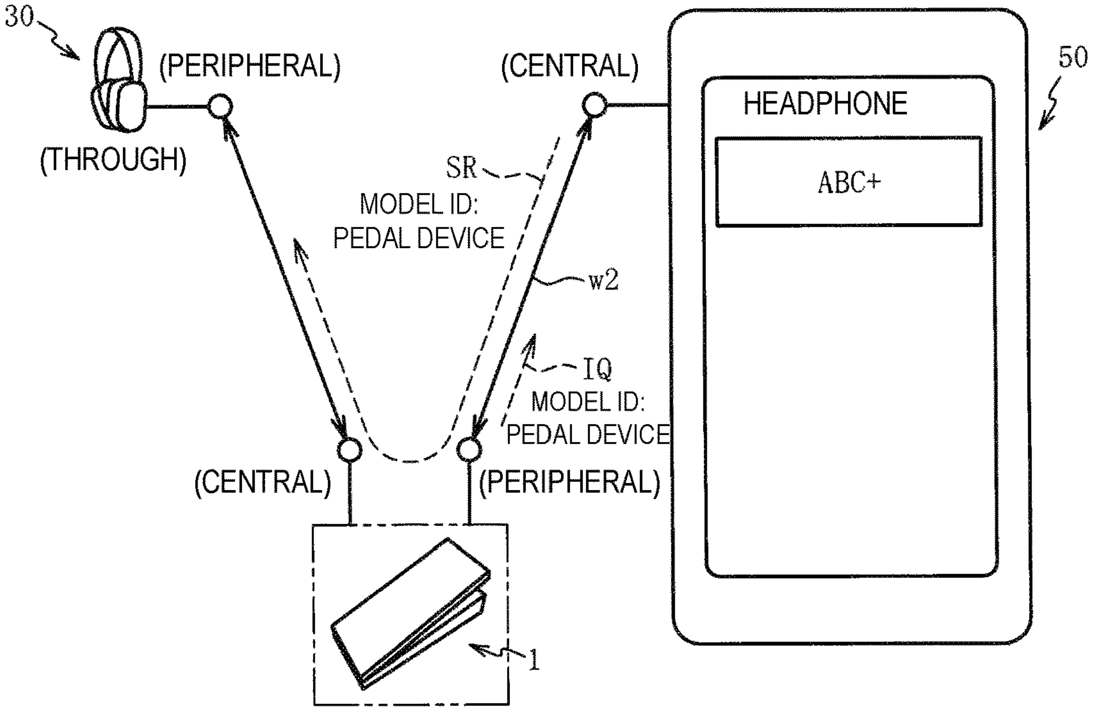

(a) of FIG. 4 is a diagram for describing acquisition of the inquiry message IQ from the headphone 30 in the portable terminal 50, and (b) of FIG. 4 is a diagram for describing acquisition of the inquiry message IQ from the pedal device 1 in the portable terminal 50. In (a) of FIG. 4, in a case where the portable terminal 50 requests the inquiry message IQ to the headphone 30, first, the portable terminal 50 creates identity request data SR for giving an instruction for request for the inquiry message IQ.

The identity request data SR includes a "model ID" representing the name or the type of a communication device that is a control target of a communication device requesting the inquiry message IQ, that is, the portable terminal 50. In (a) of FIG. 4, since the control target of the portable terminal 50 is the headphone 30, a unique ID for identifying the headphone 30 is set as the model ID in the identity request data SR.

The identity request data SR created as described above is first transmitted to the pedal device 1 that has established the second communication w2 with the portable terminal 50. The pedal device 1 transmits the received identity request data SR to the headphone 30 via the first communication w1, and checks the model ID included in the identity request data SR.

In (a) of FIG. 4, since the model ID included in the identity request data SR is "headphone", the pedal device 1 determines that the received identity request data SR does not target the pedal device 1, and discards the received identity request data SR. That is, the pedal device 1 passes the received identity request data SR to the headphone 30 therethrough.

The headphone 30 checks the model ID in the identity request data SR received from the pedal device 1, and if the model ID is its own, transmits its own inquiry message IQ to the pedal device 1. Such an inquiry message IQ includes the model ID of the headphone 30 in the same manner as the identity request data SR.

The pedal device 1 that has received the inquiry message IQ from the headphone 30 transmits the inquiry message IQ to the portable terminal 50 and checks whether the model ID included in the inquiry message IQ is its own. In (a) of FIG. 4, since the model ID included in the inquiry message IQ is an ID for identifying the headphone 30, the pedal device 1 determines that the received inquiry message IQ does not target the headphone 30 and discards the received inquiry message IQ.

The portable terminal 50 that has received the inquiry message IQ from the pedal device 1 checks whether the model ID included in the inquiry message IQ is its own. In (a) of FIG. 4, the model ID included in the inquiry message IQ is an ID for identifying the headphone 30. In this case, the portable terminal 50 acquires information regarding the headphone 30 included in the inquiry message IQ, and uses the information for subsequent control instructions for the headphone 30.

As illustrated in (b) of FIG. 4, in the same for a case where a control target of the portable terminal 50 is the pedal device 1 and the inquiry message IQ of the pedal device 1 is requested, a unique ID for identifying the pedal device 1 is set as the model ID in the identity request data SR transmitted from the portable terminal 50, and the identity request data SR is transmitted to the pedal device 1.

The pedal device 1 transmits the received identity request data SR to the headphone 30, and checks the model ID in the identity request data SR. In (b) of FIG. 4, since the model ID in the identity request data SR is the ID for identifying the pedal device 1, its own inquiry message IQ is transmitted to the portable terminal 50. Such an inquiry message IQ includes the model ID of the pedal device 1.

The portable terminal 50 that has received the inquiry message IQ from the pedal device 1 checks whether the model ID included in the inquiry message IQ is its own, and in (b) of FIG. 4, the model ID included in the inquiry message IQ is an ID for identifying the pedal device 1. In this case, the portable terminal 50 acquires information regarding the pedal device 1 included in the inquiry message IQ, and uses the information for subsequent control instructions for the pedal device 1.

On the other hand, the model ID in the identity request data SR is also checked by the headphone 30 that have received the identity request data SR from the pedal device 1. In (b) of FIG. 4, the model ID in the received identity request data SR is the "pedal device" and does not match that of the headphone 30, and thus the received identity request data SR is discarded.

As described above, in the portable terminal 50, after the second communication w2 with the pedal device 1 is established, information is acquired from the inquiry message IQ transmitted from the pedal device 1 or the headphone 30 that is regarded to be a control target and is used for subsequent control instructions. Consequently, it is possible to transmit an appropriate control instruction according to a function or a specification of a control target immediately after communication with the control target is established.

In particular, in a case where a control target of the portable terminal 50 is the headphone 30, it is possible to specifically ascertain that a communication device connected via the pedal device 1 is the headphone 30. Since the version information of the control program 32*a* (refer to FIG. 8) of the headphone 30 is acquired on the basis of the inquiry message IQ, it can be checked from the portable terminal 50 whether the control program 32*a* has been updated to an appropriate version.

Next, with reference to FIG. 5, control of the headphone 30 and the pedal device 1 performed by operating the portable terminal 50 will be described. (a) of FIG. 5 is a diagram for describing control of the headphone 30 performed by operating the portable terminal 50, and (b) of FIG. 5 is a diagram for describing control of the pedal device 1 performed by operating the portable terminal 50.

Figure 5:
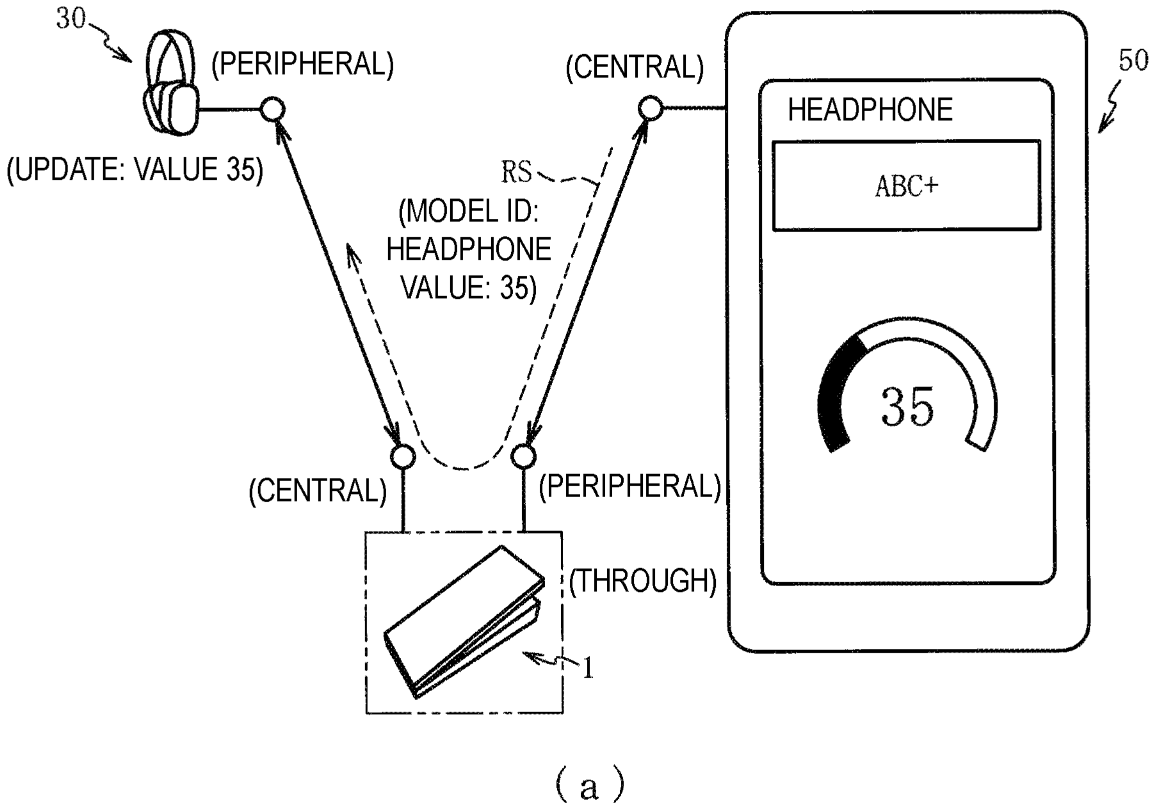
FIG. 5, (a) is a diagram for describing control of the headphone performed by operating the portable terminal, and (b) is a diagram for describing control of the pedal device performed by operating the portable terminal.
Figure 5:
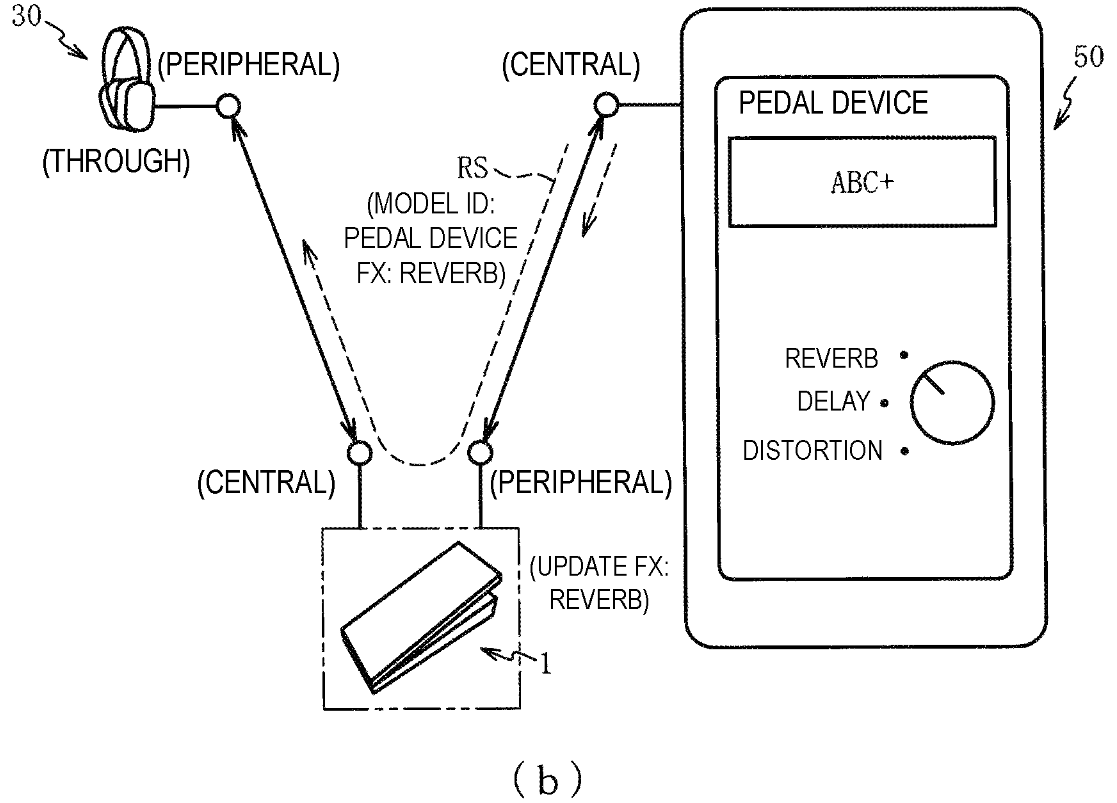

(a) of FIG. 5 exemplifies a case where a volume of a performance sound output by the headphone 30 is changed from the portable terminal 50. A target for operating the headphone 30 from the portable terminal 50 is not limited to this, and for example, the degree of acoustic effect of the performance sound output by the headphone 30 may be operated from the portable terminal 50, or other settings of the headphone 30 may be operated.

In (a) of FIG. 5, in a case where the user H inputs an instruction for updating a volume of the headphone 30 to 35 to the portable terminal 50 via the touch panel 56 (refer to FIG. 8), the portable terminal 50 creates a control instruction RS for requesting the instruction to the headphone 30. The control instruction RS includes a parameter to be updated ("volume 35" in (a) of FIG. 5) and a model ID of a control target (ID for identifying the headphone 30 in (a) of FIG. 5). The portable terminal 50 transmits a MIDI standard SysEx message including such a control instruction RS to the pedal device 1.

The pedal device 1 that has received the SysEx message transmits the SysEx message to the headphone 30 and checks the model ID included in the control instruction RS in the SysEx message. In (a) of FIG. 5, the model ID included in the control instruction RS is an ID for identifying the headphone 30, and is not a request to the pedal device 1. Therefore, the pedal device 1 discards the received SysEx message.

The headphone 30 that has received the SysEx message from the pedal device 1 checks the model ID included in the control instruction RS in the SysEx message. In (a) of FIG. 5, since the model ID included in the control instruction RS is an ID for identifying the headphone 30, the headphone 30 uses the parameter ("volume 35") included in the control instruction RS to update its own volume. Consequently, the volume of the headphone 30 is updated in response to the request from the portable terminal 50.

(b) of FIG. 5 exemplifies a case where the type of acoustic effect controlled by the pedal device 1 is changed from the portable terminal 50. A target changed from the portable terminal 50 is not limited to the type of acoustic effect controlled by operating the pedal device 1. For example, a target controlled by the pedal device 1 may be changed from an acoustic effect to a volume, or may be changed to other setting items.

In (b) of FIG. 5, in a case where the user H inputs an instruction for changing the acoustic effect controlled by the pedal device 1 to "reverb" to the portable terminal 50 via the touch panel 56, the portable terminal 50 creates a control instruction RS including a parameter to be updated ("acoustic effect (represented as "FX")/reverb" in (b) of FIG. 5) and a model ID of a control target (ID for identifying the pedal device 1 in (b) of FIG. 5). A MIDI standard SysEx message including the created control instruction RS is transmitted to the pedal device 1.

The pedal device 1 that has received the SysEx message transmits the SysEx message to the headphone 30 and checks the model ID included in the control instruction RS in the SysEx message. In (b) of FIG. 5, since the model ID included in the control instruction RS is an ID for identifying the pedal device 1, the pedal device 1 uses the parameter ("acoustic effect/reverb") included in the control instruction RS to change the acoustic effect controlled by operating its own pedal switch 15. Consequently, the acoustic effect controlled by the pedal device 1 is changed in response to the request from the portable terminal 50.

Figure 6:
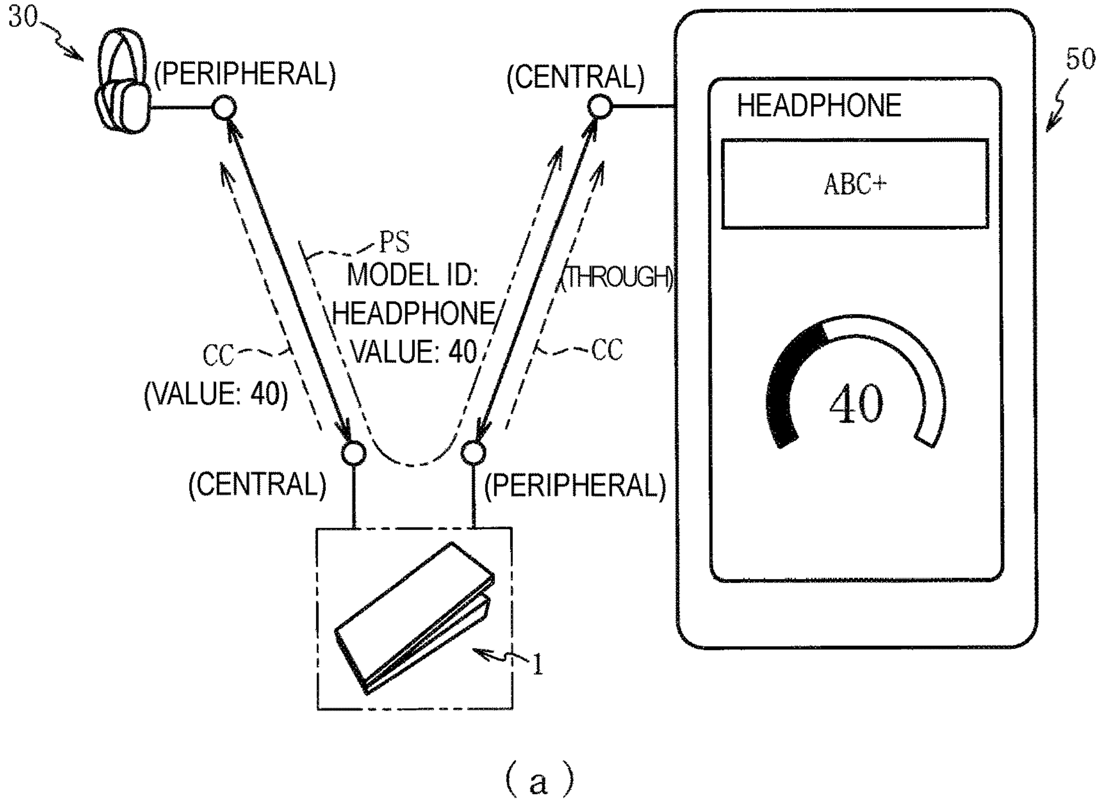
FIG. 6, (a) is a diagram for describing control of the headphone performed by operating the pedal device, and (b)
Figure 6:
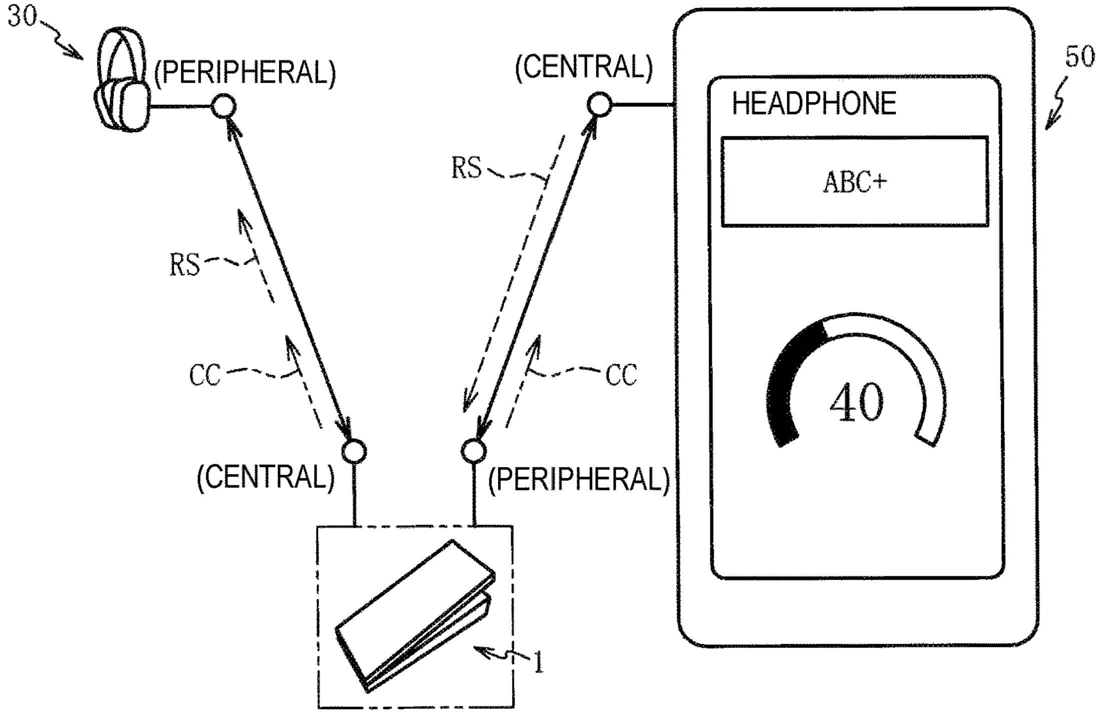

Next, control of the headphone 30 performed by operating the pedal device 1 will be described with reference to (a) of FIG. 6. (a) of FIG. 6 is a diagram for describing control of the headphone 30 performed by operating the pedal device 1. (a) of FIG. 6 exemplifies updating a volume of the headphone 30 in response to an operation on the pedal switch 15 of the pedal device 1. In this case, it is assumed that an application for controlling the headphone 30 is also executed on the portable terminal 50.

When the pedal switch 15 of the pedal device 1 is depressed by the foot of the user H, a parameter corresponding to an angle of the pedal switch 15 is transmitted to the headphone 30 and the portable terminal 50. In this case, a MIDI standard CC message including the acquired parameter is transmitted to the headphone 30 and the portable terminal 50.

When the headphone 30 receives the CC message including the update instruction CC from the pedal device 1, the headphone 30 updates its own volume by using the parameter included in the update instruction CC.

Then, a response instruction PS including the parameter included in the update instruction CC and its own model ID is created, and a MIDI standard SysEx message including the response instruction PS is transmitted to the pedal device 1.

The pedal device 1 that has received the SysEx message including the response instruction PS transmits the SysEx message to the portable terminal 50 and checks the model ID included in the response instruction PS in the SysEx message. In (a) of FIG. 6, the model ID included in the response instruction PS is an ID for identifying the headphone 30, and is not a request to the pedal device 1. Therefore, the pedal device 1 discards the received SysEx message.

The portable terminal 50 receives the update instruction CC and the SysEx message including the response instruction PS transmitted from the pedal device 1. Of these, the portable terminal 50 discards the update instruction CC and acquires the SysEx message including the response instruction PS. In a case where the model ID in the response instruction PS of the acquired SysEx message is checked and matches a control target (headphone 30 in (a) of FIG. 6) of the portable terminal 50, a corresponding setting (the volume in (a) of FIG. 6) is updated by using the parameter in the response instruction PS.

That is, in the portable terminal 50, the update instruction CC based on the pedal switch 15 from the pedal device 1 is discarded, and in the headphone 30, its own setting is updated in response to the response instruction PS transmitted when the parameter is updated on the basis of the update instruction CC based on the pedal switch 15 from the pedal device 1. Therefore, when the setting of the headphone 30 is updated by the update instruction CC from the pedal device 1, the setting of the portable terminal 50 is updated. Consequently, the update instruction CC from the pedal device 1 can be reliably reflected in the settings of the headphone 30 and the portable terminal 50.

Here, in general, the headphone 30 can communicate with only one communication device. On the other hand, in the control system S of the present embodiment, the headphone 30 and the pedal device 1 perform communication via the first communication w1, and the pedal device 1 and the portable terminal 50 perform communication via the second communication w2.

Consequently, a control instruction from the central pedal device 1 can be transmitted to the headphone 30, and a control instruction from the central portable terminal 50 can be transmitted to the headphone 30 via the second communication w2 and the first communication w1. Therefore, it is possible to provide flexible functions with the portable terminal 50, the pedal device 1, and the headphone 30, and to cause two central devices such as the pedal devices 1 and the portable terminal 50 and one peripheral device such as the headphone 30 to perform communication without using another communication device. Thus, it is possible to minimize a configuration of a communication device and its cost.

In the first communication w1 and the second communication w2 of the present embodiment, the control instruction RS from the portable terminal 50 and the update instruction CC from the pedal device 1 can be transmitted on the same communication path.

Incidentally, in the present embodiment, since the control instruction RS or the update instruction CC can be input from each of the pedal device 1 and the portable terminal 50, in the pedal device 1, a timing at which the control instruction RS from the portable terminal 50 is transmitted to the headphone 30 may overlap a timing at which the update instruction CC based on the pedal switch 15 is transmitted to the headphone 30. A process in such a case will be described with reference to (b) of FIG. 6.

(b) of FIG. 6 is a diagram for describing a case where transmission timings of the control instruction RS and the update instruction CC overlap each other. (b) of FIG. 6 illustrates a case where the control instruction RS from the portable terminal 50 is first transmitted to the headphone 30 by the pedal device 1, the pedal switch 15 is operated during the transmission, and the update instruction CC based on the operation is created.

In such a case, the transmission of the update instruction CC is started after the transmission of the previously transmitted control instruction RS is completed. Consequently, even in a case where the timings of transmitting the control instruction RS and the update instruction CC from the pedal device 1 to the headphone 30 overlap each other, transmission of the control instruction RS and the update instruction CC to the headphone 30 can be reliably completed without one thereof being lost.

Next, the function of the pedal device 1 will be described with reference to FIG. 7. FIG. 7 is a functional block diagram of the pedal device 1. As illustrated in FIG. 7, the pedal device 1 includes a first communication part 501, a reception buffer 502, a transmission buffer 503, a second communication part 504, a reception buffer 505, a transmission buffer 506, an instruction transmission part 507, the above pedal switch 15, a first storage part 508, a determination part 509, a changing part 510, a MIDI message generation part 511, the above operator 16, a pairing mode transition part 512, a second storage part 513, a first communication establishment determination part 514, and an advertising packet generation part 515.

The first communication part 501 is a part wirelessly communicating with the headphone 30, and is realized by a CPU 10 that will be described later in FIG. 8. The reception buffer 502 temporarily stores data received by the first communication part 501, and is realized by a RAM 12 described later in FIG. 8. The transmission buffer 503 temporarily stores data to be transmitted by the first communication part 501, and is realized by the RAM 12.

The second communication part 504 is a part wirelessly communicating with the portable terminal 50, and is realized by the CPU 10. The reception buffer 505 temporarily stores data received by the second communication part 504, and is realized by the RAM 12. The transmission buffer 506 temporarily stores data to be transmitted by the second communication part 504, and is realized by the RAM 12. Data such as a SysEx message received by the first communication part 501 and stored in the reception buffer 502 from the headphone 30 is sent to the transmission buffer 506, and the data is transferred from the transmission buffer 506 to the portable terminal 50 via the second communication part 504.

The instruction transmission part 507 is a part that transmits a CC message (control instruction) created by the MIDI message generation part 511 on the basis of an input from the pedal switch 15 and a SysEx message (second control instruction) received from the portable terminal 50 via the second communication part 504, to the headphone 30 via the first communication part 501, and is realized by the CPU 10. The instruction transmission part 507 has a serialization part **507*a* that generates serial data of the CC message created by the MIDI message generation part 511 and the SysEx message received from the portable terminal 50 via the second communication part 504. The CC message and SysEx message generated as the serial data by the serialization part 507***a* are transmitted to the headphone 30 via the transmission buffer 503 and the first communication part 501.

As described above, the CC message based on the input from the pedal switch 15 and the SysEx message received from the portable terminal 50 via the second communication part 504 are transmitted to the headphone 30 via the first communication part 501. Consequently, even in a case where the headphone 30 can be connected to only one control device, the headphone 30 can be controlled from two control devices such as the pedal device 1 and the portable terminal 50.

The serialization part 507*a* generates serial data of the CC message created by the MIDI message generation part 511 and the SysEx message received from the portable terminal 50 via the second communication part 504, and thus the CC message and the SysEx message can be transmitted on the same communication path of the first communication part 501.

Next, creation of the CC message described above will be described. The first storage part 508 stores a model ID and version information regarding the pedal device 1, and is realized by a flash ROM 11 that will be described later in FIG. 8. The determination part 509 is a part that determines whether the SysEx message received from the portable terminal 50 via the second communication part 504 and the reception buffer 505 is a control instruction to itself, and is realized by the CPU 10.

In a case where the determination part 509 determines that the SysEx message received via the second communication part 504 is a control instruction to itself, the changing part 510 is a part that changes the CC message generated by the MIDI message generation part 511 on the basis of the pedal switch 15, according to the SysEx message, and is realized by the CPU 10.

The MIDI message generation part 511 creates the CC message on the basis of a parameter input from the pedal switch 15 and a model ID or version information of the first storage part 508, and is realized by the CPU 10. In the MIDI message generation part 511, in a case where the determination part 509 determines that the SysEx message received via the second communication part 504 is a control instruction to itself, the CC message generated by the MIDI message generation part 511 is changed by the changing part 510 on the basis of the pedal switch 15 according to the SysEx message. Consequently, a control target that is controlled on the basis of an operation on the pedal switch 15 can be changed according to the SysEx message from the portable terminal 50.

Next, an operation at the time of establishing communication with the portable terminal 50 will be described. The pairing mode transition part 512 determines whether transition to the advertising mode described in (b) of FIG. 3 has occurred by double-clicking or single-clicking the operator 16, and is realized by the CPU 10. The second storage part 513 stores information regarding the pedal device 1 itself ("ABC") and information regarding the pedal device 1 itself and indicating that communication with the headphone 30 has been established ("ABC+"), and is realized by the flash ROM 11.

The first communication establishment determination part 514 acquires information from the second storage part 513 depending on whether communication with the headphone 30 using the first communication part 501 has been established, and is realized by the CPU 10. Specifically, in a case where the communication with the headphone 30 using the first communication part 501 has not been established, the first communication establishment determination part 514 acquires the information regarding the pedal device 1 itself from the second storage part 513, and in a case where the communication with the headphone 30 using the communication part 501 has been established, acquires the information regarding the pedal device 1 itself and the information indicating that the communication with the headphone 30 has been established from the second storage part 513.

The advertising packet generation part 515 creates the advertising packet AD on the basis of the information acquired from the first communication establishment determination part 514 in a case where the pairing mode transition part 512 determines that the advertising mode is set, and transmits the advertising packet AD to the portable terminal 50 via the second communication part 504, and is realized by the CPU 10. The advertising packet AD generated by the advertising packet generation part 515 is transmitted to the portable terminal 50 via the transmission buffer 506 and the second communication part 504.

That is, in a case where communication with the headphone 30 using the first communication part 501 has been established, the advertising packet AD transmitted from the advertising packet generation part 515 to the portable terminal 50 includes the information regarding the pedal device 1 itself and the information indicating that the communication with the headphone 30 has been established. Consequently, it can be determined that the portable terminal 50 connected to the headphone 30 via the pedal device 1 can actually communicate with the headphone 30.

Next, an electrical configuration of the control system S will be described with reference to FIG. 8. FIG. 8 is a block diagram illustrating an electrical configuration of the control system S. The headphone 30 has a CPU 31, a flash ROM 32, and a RAM 33, which are connected to an input/output port 35 via a bus line 34. The input/output port 35 is further connected to a musical instrument receiving device 36, the above operator 37 and LED 38, an amplifier 39, a wireless communication device 40 for wireless communication with the pedal device 1, and a gyro sensor 41.

The CPU 31 is an arithmetic part that controls each part connected thereto via the bus line 34. The flash ROM 32 is a rewritable nonvolatile storage device that stores a program executed by the CPU 31, fixed value data, and the like, and stores a control program 32*a* and model ID data 32*b* in which the model ID of the headphone 30 described above is stored. When the control program 32*a* is executed by the CPU 31, a headphone process in FIG. 9 is executed. The RAM 33 is a memory that rewritably stores various types of work data, flags, and the like when the program is executed by the CPU 31.

The musical instrument receiving device 36 is a device that receives a performance signal wirelessly transmitted from the musical instrument transmission device Gt described above. The amplifier 39 is a device that amplifies a performance sound created by the CPU 31. The speakers R and L described above are connected to the amplifier 39, and the performance sound amplified by the amplifier 39 is output to the speakers R and L. The gyro sensor 41 is a sensor that detects angular velocity, and detects an amount of movement, a tilt, and a rotation of the head of the user H wearing the headphone 30 up and down, front and back, and left and right, respectively.

The headphone 30 is configured to be able to output a mixed sound of a performance sound ("first musical sound")

based on a performance signal input from the electric guitar G via the musical instrument receiving device 36 and a musical sound ("second musical sound") input from the portable terminal 50 or the like via the wireless communication device 40.

In the mixed sound, for at least one of the first musical sound and the second musical sound, a virtual position where the musical sound is output is further configured to be able to be changed according to an amount of movement, a tilt, or the like of the head of the user H detected by the gyro sensor 41. For example, by setting the second musical sound as a drum sound and setting a virtual position where the drum sound is output behind the user H who plays the electric guitar G, the user H always hears that the drum sound is output from behind even in a case where a tilt or the like of the head of the user H that is wearing the headphone 30 and is playing the electric guitar G is changed.

Next, an electrical configuration of the pedal device 1 of the control system S will be described. The pedal device 1 has a CPU 10, a flash ROM 11, and a RAM 12, which are connected to an input/output port 14 via a bus line 13. The input/output port 14 is further connected to the above pedal switch 15, operator 16, and LED 17, and a wireless communication device 22 for wireless communication with the headphone 30 and the portable terminal 50.

The CPU 10 is an arithmetic part that controls each part connected thereto via the bus line 13. The flash ROM 11 is a rewritable nonvolatile storage device that stores a program executed by the CPU 10, fixed value data, and the like, and stores a control program 11*a* and model ID data 11*b* in which the model ID of the headphone 30 described above is stored. When the control program 11*a* is executed by the CPU 10, a pedal process in (a) of FIG. 11 is executed.

The RAM 12 is a memory that rewritably store various types of work data, flags, and the like when the program is executed by the CPU 10, and is provided with a transfer data memory 12*a* in which a SysEx message received from the headphone 30 or the portable terminal 50 and its transmission destination are stored and a performance data memory 12*b* in which a CC message created on the basis of the pedal switch 15 is stored.

Next, an electrical configuration of the portable terminal 50 of the control system S will be described. The portable terminal 50 has a CPU 51, a flash ROM 52, and a RAM 53, which are connected to an input/output port 55 via a bus line 54. The input/output port 55 is further connected to a wireless communication device 58 for wireless communication with the pedal device 1, a touch panel 56 into which an instruction from the user H is input, and the LCD 57 described above.

The CPU 51 is an arithmetic part that controls each part connected thereto via the bus line 54. The flash ROM 52 is a rewritable nonvolatile storage device that stores a program executed by the CPU 51, fixed value data, and the like, and stores a control program 52*a*. When the control program 52*a* is executed by the CPU 51, a portable terminal process in FIG. 13 is executed. More specifically, the control program 52*a* includes an application for controlling the pedal device 1 and an application for controlling the headphone 30, and a portable terminal process corresponding to an application that is started according to an operation on the touch panel 56 is executed. Details of the portable terminal process will be described later with reference to FIG. 13.

The RAM 53 is a memory that rewritably stores various types of work data, flags, and the like when the program is executed by the CPU 51, and is provided with an IQ memory 53*a* in which the above inquiry message IQ is stored.

Next, processes of the control system S will be described with reference to FIGS. 9 to 13. First, a process executed by the CPU 31 of the headphone 30 will be described. FIG. 9 is a flowchart illustrating a headphone process. The headphone process is a process executed when power of the headphone 30 is turned on.

In the headphone process, first, it is checked whether a connection start operation for giving an instruction for starting connection with another communication device such as the pedal device 1 has been performed on the operator 37 by the user H (S1). Specifically, in a case where the operator 37 is pressed and held for a long time, it is determined that the connection start operation has been performed. In the process in S1, in a case where the connection start operation has been performed (S1: Yes), a peripheral connection process (S2) is executed. Here, the peripheral connection process will be described with reference to (a) of FIG. 10.

(a) of FIG. 10 is a flowchart illustrating the peripheral connection process. The peripheral connection process is executed by the CPU 31 of the headphone 30, and an equivalent process is also executed by the CPU 10 of the pedal device 1.

First, in the peripheral connection process, the advertising packet AD described above in FIG. 3 is transmitted to another communication device (S20). The transmission of the advertising packet AD to other communication device is performed by using the wireless communication device 40 in the case of the headphone 30, and is performed by using the wireless communication device 22 in the case of the pedal device 1. Hereinafter, it is assumed that communication with another communication device in the peripheral connection process is performed by using the wireless communication device 40 in the case of the headphone 30, and is performed by using the wireless communication device 22 in the case of the pedal device 1.

After the process in S20, it is checked whether a connection request from another communication device has been received according to the advertising packet AD transmitted in the process in S20 (S21). In the process in S21, in a case where the connection request has been received (S21: Yes), a connection process with another communication device (that is, the pedal device 1 or the portable terminal 50) that has transmitted the connection request is performed (S22).

On the other hand, in a case where the connection request has not been received in the process in S21 (S21: No), it is checked in the process in S20 whether a predetermined time or more has elapsed from the start of transmission of the advertising packet AD (S23). In the process in S23, in a case where a predetermined time or more has not elapsed from the start of transmission of the advertising packet AD (S23: No), the processes in and after S20 are executed again. After the process in S22 or in a case where a predetermined time or more has elapsed from the start of transmission of the advertising packet AD in the process in S23 (S23: Yes), the peripheral connection process is finished.

FIG. 9 will be referred to again. In the process in S1, in a case where the connection start operation has not been performed (S1: No), or after the peripheral connection process in S2, it is checked whether the identity request data SR described in FIG. 4 has been received (S3). In a case where the identity request data SR has been received in the process in S3 (S3: Yes), an identity request response process (S4) is executed. Here, the identity request response process will be described with reference to (b) of FIG. 10.

(b) of FIG. 10 is a flowchart illustrating the identity request response process. The identity request response process is executed by the CPU 31 of the headphone 30, and an equivalent process is also executed by the CPU 10 of the pedal device 1.

In the identity request response process, first, it is checked whether a model ID in the received identity request data SR is its own (S30). Specifically, the model ID included in the identity request data SR and its own model ID, that is, the model ID in the model ID data 32*b* in the case of the headphone 30, or the model ID in the model ID data 11*b* in the case of the pedal device 1 are compared with each other, and it is checked whether the model IDs match each other.

In the process in S30, in a case where the model ID in the identity request data SR is its own (S30: Yes), the own inquiry message IQ (refer to FIG. 4) is created, and the created inquiry message IQ is transmitted (returned) to a transmission source of the identity request data SR, that is, the pedal device 1 or the portable terminal 50 (S31). This transmission is performed by using the wireless communication device 40 in the case of the headphone 30, and is performed by using the wireless communication device 22 in the case of the pedal device 1.

On the other hand, in the process in S30, in a case where the model ID in the identity request data SR is not its own (S30: No), the received identity request data SR is discarded (S32). After the processes in S31 and S32, the identity request response process is finished.

FIG. 9 will be referred to again. In the process in S3, it is checked whether the identity request data SR has not been received, or whether the SysEx message has been received after the process in S4 (S5). In a case where the SysEx message has been received in the process in S5 (S5: Yes), it is checked whether the model ID in the control instruction RS in the SysEx message matches the model ID in the model ID data 32*b* (S6).

In the process in S6, in a case where the model ID in the control instruction RS in the SysEx message matches the model ID in the model ID data 32*b* (S6: Yes), an own setting is updated by using a parameter included in the control instruction RS in the SysEx message (S7). On the other hand, in a case where the model ID in the control instruction RS in the SysEx message does not match the model ID in the model ID data 32*b* (S6: No), the received SysEx message is discarded (S8).

In the process in S5, in a case where the SysEx message has not been received (S5: No), or after the processes in S7 and S8, it is checked whether the CC message described in FIG. 6 (refer to (a) of FIG. 6) has been received (S9). In a case where the CC message has been received in the process in S9 (S9: Yes), it is checked whether a mode for the headphone 30 to update its own setting according to the received CC message is set (S10).

In the process in S10, in a case where the mode for updating the own setting according to the received CC message is set (S10: Yes), the own setting is updated by using the parameter of the update instruction CC included in the CC message (S11).

After the process in S11, the response instruction PS (refer to (a) of FIG. 6) is created from the parameter in the update instruction CC in the CC message received in the process in S9 and the model ID in the model ID data 32*b*, and the SysEx message incorporating the response instruction PS is transmitted (returned) to a transmission source of the CC message, that is, the pedal device 1 (S12). On the other hand, in the process in S10, in a case where the mode for updating the own setting according to the received CC message is not set (S10: No), the received CC message is discarded (S13).

In the process in S9, in a case where the CC message has not been received (S9: No), a unique process (S14) is executed after the processes in S12 and S13. The unique process is another process performed by the headphone 30, and is, for example, a process of outputting a performance sound based on a performance signal input from the electric guitar G via the musical instrument receiving device 36 or a performance sound input from the portable terminal 50 via the pedal device 1, to the speakers R and L via the amplifier 39. After the unique process in S14, the processes in and after 51 are repeatedly performed.

Next, a process executed by the CPU 10 of the pedal device 1 will be described. (a) of FIG. 11 is a flowchart illustrating a pedal process. The pedal process is a process executed in a case where power of the pedal device 1 is turned on.

In the pedal process, first, it is checked whether a connection scan start operation for giving an instruction for starting reception of the advertising packet AD from another communication device (specifically, the headphone 30) has been performed (S50). Specifically, as described above in (a) of FIG. 3, in a case where the user H double-clicks the operator 16 until a lighting color of the LED 17 becomes white (that is, the central function), and then the user H single-clicks the operator 16 such that the mode transitions a scan mode, it is determined that the connection scan start operation has been performed. In the process in S50, in a case where the connection scan start operation has been performed (S50: Yes), a central connection process (S51) is executed. Here, the central connection process will be described with reference to (b) of FIG. 11.

(b) of FIG. 11 is a flowchart illustrating the central connection process. The central connection process is executed by the CPU 10 of the pedal device 1, and an equivalent process is also executed by the CPU 51 of the portable terminal 50. In the central connection process, first, the advertising packet AD starts to be received (S70). The reception of the advertising packet AD is performed by using the wireless communication device 22 in the case of the pedal device 1, and is performed by using the wireless communication device 58 in the case of the portable terminal 50. Hereinafter, it is assumed that communication with another communication device in the central connection process is performed by using the wireless communication device 22 in the case of the pedal device 1 and is performed by using the wireless communication device 58 in the case of the portable terminal 50.

After the process in S70, it is checked whether the advertising packet AD has been received from another communication device (S71). In the process in S71, in a case where the advertising packet AD is received (S71: Yes), a connection request is transmitted to the communication device from which the advertising packet AD has been received (S72), and a connection process with the communication device is performed (S73).

In a case where the advertising packet AD has not been received in the process in S71 (S71: No), it is checked whether a predetermined time or more has elapsed from the start of receiving the advertising packet AD in the process in S70 (S74). In the process in S74, in a case where a predetermined time or more has not elapsed from the start of receiving the advertising packet AD (S74: No), the process in S70 or less is repeatedly performed.

On the other hand, in the process in S74, in a case where a predetermined time or more has elapsed from the start of receiving the advertising packet AD (S74: Yes), or after the process in S73, the central connection process is finished.

Through the central connection process and the peripheral connection process described above, the first communication w1 between the headphone 30 and the pedal device 1 and the second communication w2 between the pedal device 1 and the portable terminal 50 are established.

(a) of FIG. 11 will be referred to again. In the process in S50, in a case where the connection scan start operation has not been performed (S50: No), or after the central connection process in S51, it is checked whether the connection start operation has been performed on the operator 16 (S52). Specifically, as described above in (b) of FIG. 3, in a case where the user H double-clicks the operator 16 until a lighting color of the LED 17 becomes blue (that is, the peripheral function), and then the user H single-clicks the operator 16 such that the mode transitions to an advertising mode, it is determined that the connection start operation has been performed. In a case where the connection start operation has been performed in the process in S52 (S52: Yes), it is checked whether communication with another communication device has been established in the central connection process in S51 (S53).

In the process in S53, in a case where communication with another communication device has been established in the central connection process (S53: Yes), its own information and information regarding the communication device with which communication has been established is added to the advertising packet AD (refer to (b) of FIG. 3 (S54). In the process in S53, in a case where communication with another communication device has not been established in the central connection process (S53: No), its own information is added to the advertising packet AD (S55). After the processes in S54 and S55, the peripheral connection process in S2 described above is executed.

In a case where the connection start operation has not been performed in the process in S52 (S52: No) or after the process in S2, it is checked whether the identity request data SR (refer to FIG. 4) has been received (S56). In a case where the identity request data SR has been received in the process in S55 (S56: Yes), the above identity request response process (S4) is executed. In the process in S56, in a case where the identity request data SR has not been received (S56: No), the process in S4 is skipped. After the processes in S4 and S56, a pedal device transmission/reception process (S57) is executed, and the processes in and after S50 are repeatedly performed. Here, the pedal device transmission/reception process will be described with reference to FIG. 12.

FIG. 12 is a flowchart illustrating the pedal device transmission/reception process. In the pedal device transmission/reception process, first, it is checked whether a SysEx message has been received (S80). In a case where the SysEx message has been received in the process in S80 (S80: Yes), the received SysEx message and a transmission destination of the SysEx message are stored in the transfer data memory 12*a* (S81). Specifically, the transmission destination of the SysEx message is set to the headphone 30 in a case where the SysEx message has been received from the portable terminal 50, and is set to the portable terminal 50 in a case where the SysEx message has been received from the headphone 30.

After the process in S81, it is checked whether a model ID in the control instruction RS in the SysEx message matches the model ID in the model ID data 11*b* (S82). In the process in S82, in a case where the model ID in the control instruction RS in the SysEx message matches the model ID in the model ID data 11*b* (S82: Yes), an own setting is updated by using a parameter included in the control instruction RS in the SysEx message (S83). Consequently, for example, in a case where the control instruction RS in the SysEx message received from the portable terminal 50 changes the acoustic effect controlled by the pedal device 1 to "delay", the acoustic effect of which an effect amount is controlled by the pedal switch 15 of the pedal device 1 is thereafter changed to "delay".

On the other hand, in a case where the model ID in the control instruction RS in the SysEx message does not match the model ID in the model ID data 11*b* (S82: No), the received SysEx message is discarded (S84).

In a case where the SysEx message has not been received in the process in S80 (S80), it is checked whether the pedal switch 15 has been operated after the process in S83 and S84 (S85). In the process in S85, in a case where the pedal switch 15 has been operated (S85: Yes), a parameter corresponding to an angle is acquired from the pedal switch 15, and an update instruction CC is created on the basis of the acquired parameter. A CC message including the created update instruction CC is created (S86). After the process in S86, the created CC message is stored in the performance data memory 12*b* (S87).

In the process in S85, in a case where the pedal switch 15 has not been operated (S85: No), or after the process in S87, it is checked whether there is a SysEx message that has not been transmitted or is being transmitted in the transfer data memory 12*a* (S88). In the process in S88, in a case where there is a SysEx message that has not been transmitted or is being transmitted in the transfer data memory 12*a* (S88: Yes), the SysEx message in the transfer data memory 12*a* is transmitted to a transmission destination stored in the transfer data memory 12*a* (S89).

On the other hand, in the process in S88, in a case where there is no SysEx message that has not been transmitted or is being transmitted in the transfer data memory 12*a* (S88: No), it is checked whether there is a CC message that has not been transmitted or is being transmitted in the performance data memory 12*b*. (S90).

In the process in S90, in a case where there is a CC message that has not been transmitted or is being transmitted in the performance data memory 12*b* (S90: Yes), the CC message in the performance data memory 12*b* is transmitted to each of communication devices connected to the pedal device 1 (S91). On the other hand, in the process in S90, in a case where there is no CC message that has not been transmitted or is being transmitted in the performance data memory 12*b* (S90: No), the process in S91 is skipped.

That is, even in a case where the SysEx message has been received from the portable terminal 50 or the headphone 30 and the CC message is created by operating the pedal switch 15 in a state in which the received SysEx message is not transmitted or is being transmitted, transmission of the previously received SysEx message is completed, and then transmission of the CC message created later is started. By serializing the SysEx message and the CC message received as described above for transmission, the SysEx message and the CC message can be transmitted via the same communication path (the first communication w1 or the second communication w2).

After the process in S89, S90, or S91, the pedal device transmission/reception process is finished.

Next, a process executed by the CPU 51 of the portable terminal 50 will be described. FIG. 13 is a flowchart illustrating a portable terminal process. The portable terminal process is a process executed in a case where a start instruction for an application for controlling the pedal device 1 or an application for controlling the headphone 30 is input through an operation of the user H on the touch panel 56.

In the portable terminal process, first, it is checked whether the connection scan start operation for giving an instruction for starting reception of the advertising packet AD from another communication device (specifically, the pedal device 1) has been performed from the touch panel 56 (S100). Specifically, on the portable terminal 50, in a case where a button (not illustrated) for starting connection scanning displayed on the LCD 57 is displayed after the application for controlling the pedal device 1 or the application for controlling the headphone 30 is started, and the button is selected via the touch panel 56, it is determined that the connection scan start operation has been performed. In a case where the connection scan start operation has been performed in the process in S100 (S100: Yes), the above central connection process (S51) is executed.

After the central connection process in S51, it is checked whether the advertising packet AD received in the central connection process includes information regarding a communication device with which communication has been established (S101). In the process in S105, in a case where the advertising packet AD includes the information regarding the communication device with which communication has been established (S101: Yes), "ABC+" is displayed on the LCD 57 (S102). On the other hand, in the process in S105, in a case where the advertising packet AD does not include the information regarding the communication device with which communication has been established (S101: No), "ABC" is displayed on the LCD 57 (S103).

After the processes in S102 and S103, the identity request data SR is created on the basis of a model ID of the control target (that is, the pedal device 1 or the headphone 30) of the started application, and is transmitted to the connected communication device (specifically, the pedal device 1) (S104).

In a case where the connection scan start operation has not been performed in the process in S100 (S100: No), or after the process in S104, it is checked whether the inquiry message IQ has been received (S105). In a case where the inquiry message IQ has been received in the process in S105 (S105: Yes), the received inquiry message IQ is stored in the IQ memory 53*a* (S106). On the other hand, in the process in S105, in a case where the inquiry message IQ has not been received (S105: No), the process in S106 is skipped.

After the processes in S105 and S106, a portable terminal transmission/reception process (S107) is executed, and the processes in and after S100 are repeatedly performed. Here, the portable terminal transmission/reception process will be described with reference to FIG. 14.

FIG. 14 is a flowchart illustrating the portable terminal transmission/reception process. In the portable terminal transmission/reception process, first, it is checked whether a SysEx message has been received (S120). In a case where the SysEx message has been received in the process in S120 (S120: Yes), it is checked whether the model ID in the control instruction RS in the SysEx message matches the model ID of the control target of the started application (S121).

In the process in S121, in a case where the model ID in the control instruction RS in the SysEx message matches the model ID of the control target of the started application (S121: Yes), the own setting is updated by using the parameter included in the control instruction RS in the SysEx message (S122). On the other hand, in a case where the model ID in the control instruction RS in the SysEx message does not match the model ID of the control target of the started application (S121: No), the received SysEx message is discarded (S123).

In the process in S120, in a case where the SysEx message has been received (S120: No) or after the processes in S122 and S123, it is checked whether the CC message has been received (S124). In a case where the CC message has been received in the process in S124 (S124: Yes), it is checked whether a mode for updating the own setting according to the CC message is set (S125).

In the process in S125, in a case where the mode for updating the own setting according to the CC message is set (S125: Yes), the own setting is updated by using the parameter of the update instruction CC included in the CC message (S126). On the other hand, in the process in S125, in a case where there is the mode for updating the own setting according to the received CC message is not set (S125: No), the received CC message is discarded (S127).

In a case where the CC message has been received in the process in S124 (S124: Yes), or after the processes in S126 and S127, it is checked whether a parameter (for example, the volume in (a) of FIG. 5 or the type of acoustic effect in (b) of FIG. 5) has been input from the user H via the touch panel 56 (S128). In the process in S128, in a case where the parameter has been input (S128: Yes), the own setting is updated by using the input parameter (S129).

After the process in S129, the control instruction RS is created from the input parameter, the model ID of the control target of the started application, and the inquiry message IQ in the IQ memory 53*a*. A SysEx message including the created control instruction RS is created and transmitted to the connected communication device (specifically, the pedal device 1) (S130). Consequently, the control instruction RS from the portable terminal 50 is transmitted to the pedal device 1 and the headphone 30.

In the process in S128, in a case where the parameter has not been input from the touch panel 56 (S128: No), or after the process in S130, the portable terminal transmission/reception process is finished.

Although the above description has been made on the basis of the above embodiment, it can be easily inferred that various improvements and changes are possible.

In the above embodiment, the headphone 30 and the effectors 300 and 310 (refer to (a) of FIG. 3) are exemplified as devices connected to the pedal device 1 and the portable terminal 50, but the disclosure is not limited to these. An electronic musical instrument other than the headphone 30 and the effectors 300 and 310, for example, a synthesizer 350 illustrated in FIG. 15 may be connected. That is, in a control system S' illustrated in FIG. 15, the first communication w1 described above is established between the synthesizer 350 and the pedal device 1.

A musical score is displayed on the LCD 57 of the portable terminal 50 in the modification example. By operating the touch panel 56, a position of a displayed musical score is changed. In this case, the position of the musical score displayed on the LCD 57 is also changed by operating the pedal switch 15 of the pedal device 1.

The synthesizer 350 in the modification example is mainly provided with a keyboard 354, setting keys 355 for inputting various settings, and a musical score LCD 356. The keyboard 354 is provided with a plurality of arranged keys 354*a* and is an input device for acquiring performance information by performance of the user H. MIDI standard performance information corresponding to an operation of pressing/releasing the key 354*a* by the user H is output to the CPU 351 (refer to FIG. 16).

The musical score LCD 356 is a display device that displays the same musical score as a musical score displayed on the LCD 57 of the portable terminal 50 described above. A musical score displayed on the musical score LCD 356 and a display position thereof are transmitted from the portable terminal 50 and the pedal device 1.

That is, in a case where a display position of a musical score is changed by the portable terminal 50, or in a case where the display position of the musical score is changed by the pedal switch 15 of the pedal device 1, the musical score LCD 356 displays a musical score equivalent to a musical score displayed on the LCD 57 of the portable terminal 50. Consequently, the display position of the musical score on one synthesizer 350 can be changed from two devices such as the portable terminals 50 and the pedal device 1. In particular, since the pedal switch 15 of the pedal device 1 is operated by being depressed with the foot of the user H, the user H can change the display position of the musical score on the musical score LCD 356 without taking his/her hand off the keyboard 354.

Next, with reference to FIG. 16, an electrical configuration of the control system S' in the modification example will be described. FIG. 16 is a block diagram illustrating the electrical configuration of the control system S'. The synthesizer 350 of the control system S' has a CPU 351, a flash ROM 352, and a RAM 353, which are connected via a bus line 357. The bus line 357 is further connected to the keyboard 354, the setting keys 355, the musical score LCD 356, a wireless communication device 358 that wirelessly communicates with the pedal device 1, a sound source 359, and a digital signal processor 360 (hereinafter referred to as a "DSP 360"). The DSP 360 is also connected to the sound source 359.

The CPU 351 is an arithmetic part that controls each part connected thereto via the bus line 357. The flash ROM 352 is a rewritable nonvolatile storage device that stores a program executed by the CPU 351 and fixed value data, and stores a control program 352*a* and model ID data 352*b* in which a model ID is stored. When the control program 352*a* is executed by the CPU 351, a process equivalent to the headphone process of FIG. 9 is executed. In the unique process (S14) in the headphone process, a specific process of the synthesizer 350 is executed, and details thereof will be described later with reference to FIG. 17.

The RAM 353 is a memory that rewritably stores various types of work data, flags, and the like in a case where the program is executed by the CPU 351. The sound source 359 is a device that outputs waveform data according to performance information input from the CPU 351. The DSP 360 is an arithmetic device for arithmetically processing the waveform data input from the sound source 359. A digital-to-analog converter (DAC) 361 is connected to the DSP 360, an amplifier 362 is connected to the DAC 361, and a speaker 363 is connected to the amplifier 362.

Next, a process executed by the CPU 351 of the synthesizer 350 will be described. A process related to communication between the pedal device 1 and the portable terminal 50 in the synthesizer 350 is substantially the same as the process of the headphone 30 except for the connection start operation (S1) and the unique process (S14) in the headphone process in FIG. 9 in the above embodiment. In the synthesizer 350, it is determined that the connection start operation in the process in S1 of the headphone process has been performed by pressing and holding the predetermined setting key 355.

Next, a unique process (S14) of the synthesizer 350 will be described. FIG. 17 is a flowchart illustrating the unique process of the synthesizer 350 in the modification example. In the unique process of the synthesizer 350, first, a switch event process is performed (S200). In the switch event process, it is checked whether the setting key 355 has been operated, and in a case where the setting key 355 has been operated, a process corresponding to the setting key 355 is performed.

After the process in S200, a keyboard event process (S201) is performed. In the keyboard event process, it is detected which key 354*a* is pressed or released on the keyboard 354. After the process in S201, a MIDI process is performed (S202). In the MIDI process, a performance sound is output and the output is stopped according to an operation on the key 354*a* detected in the process in S201, and a musical score to be displayed on the musical score LCD 356 or a display position of the musical score is acquired on the basis of the update instruction CC from the pedal device 1 or a parameter included in the control instruction RS from the portable terminal 50.

After the process in S202, an automatic performance process (S203) is performed. In this automatic performance process, a concert magic performance process, an automatic accompaniment process, a demonstration process, and the like are performed. After the process in S203, a musical score display process (S204) is performed. In the musical score display process, an image of the musical score is created on the basis of the musical score or the display position of the musical score acquired in the MIDI process, and is displayed on the musical score LCD 356. Consequently, a musical score equivalent to the musical score displayed on the LCD 57 of the portable terminal 50 is displayed on the musical score LCD 356. After the process in S204, other processes (S205) related to the synthesizer 350 are performed, and the unique process is finished.

In the modification example, an example where the musical score displayed on the LCD 57 of the portable terminal 50 is displayed on the musical score LCD 356 of the synthesizer 350, and the position of the musical score displayed on the musical score LCD 356 is changed through an operation from the pedal device 1 and the portable terminal 50 has been described. However, the disclosure is not limited to this. For example, in a musical score displayed on the LCD 57 and the musical score LCD 356, a display mode (for example, a color, a size of a musical note, or marking) of the musical note to be played at present is configured to be able to be changed, and a musical note or the like of which a display mode is changed by operating the portable terminal 50 and the pedal device 1 may be changed (forward, backward, or the like). A volume of a performance sound output by the synthesizer 350 and the degree or type of acoustic effect added to the performance sound may be changed by operating the portable terminal 50 and the pedal device 1.

In the above embodiment, the pedal device 1 having the pedal switch 15 has been exemplified as a control device, but the disclosure is not limited to this. For example, the control device may be a device having a switch for switching between on and off states, or a device having a "knob" or a fader capable of variably controlling an output parameter. The control device may be a device that uses sensor information (for example, a device that acquires an amount of change from an acceleration sensor and controls a control target according to the amount of change), or a device that can set other parameters.

In the above embodiment, the portable terminal 50 that executes the control program 52*a* has been exemplified as a central communication device that transmits a control instruction to the headphone 30 and the pedal device 1, but the disclosure is not limited to this. For example, an information processing device such as a PC or a tablet terminal may execute the control program 52*a* so as to be used as a central communication device that transmits a control instruction to the headphone 30 and the pedal device 1. A dedicated device that stores the control program 52*a* in a ROM or the like and executes only the control program 52*a* may be a central communication device that transmits a control instruction to the headphone 30 and the pedal device 1.

What is claimed is:

1. A control device that controls an electronic musical instrument, and relays control information transmitted from a portable terminal that controls the electronic musical instrument to the electronic musical instrument in order to control the electronic musical instrument, the control device comprising:

a first communication part that performs wireless communication between the control device and the electronic musical instrument; and a second communication part that performs wireless communication between the control device and the portable terminal on the basis of the Bluetooth (registered trademark) Low Energy standard, wherein, in establishment of the wireless communication between the control device and the electronic musical instrument, the second communication part transmits an advertising packet to which an ID for identifying the control device is added to the portable terminal in a case where the wireless communication between the control device and the electronic musical instrument using the first communication part has not been established, and the second communication part transmits an advertising packet to which an ID for identifying the control device including information indicating that the wireless communication between the control device and the electronic musical instrument has been established is added to the portable terminal in a case where the wireless communication between the control device and the electronic musical instrument using the first communication part has been established.

2. The control device according to claim 1, further comprising:

an input part that inputs a first control instruction; and an instruction transmission part that transmits the first control instruction input by the input part and a second control instruction received from the portable terminal via the second communication part to the electronic musical instrument via the first communication part.

3. The control device according to claim 2, wherein the first control instruction is an instruction using a MIDI standard control change message, and wherein the second control instruction is an instruction using a MIDI standard system exclusive message.

4. The control device according to claim 1, wherein the first communication part performs the wireless communication on the basis of the Bluetooth (registered trademark) Low Energy standard.

5. The control device according to claim 1, wherein the control device is a pedal device.

6. A control method executed by a control device connected to, via wireless communication, an electronic musical instrument and a portable terminal that controls the electronic musical instrument, wherein the control device relays control information transmitted from the portable terminal to the electronic musical instrument in order to control the electronic musical instrument, the control method comprising:

a first communication step of performing wireless communication between the control device and the electronic musical instrument; and a second communication step of performing wireless communication between the control device and the portable terminal on the basis of the Bluetooth (registered trademark) Low Energy standard, wherein, in the second communication step, in establishment of the wireless communication between the control device and the electronic musical instrument, an advertising packet to which an ID for identifying the control device is added is transmitted to the portable terminal in a case where the wireless communication between the control device and the electronic musical instrument using the first communication part has not been established, and an advertising packet to which an ID for identifying the control device including information indicating that the wireless communication between the control device and the electronic musical instrument has been established is added is transmitted to the portable terminal in a case where the wireless communication between the control device and the electronic musical instrument using the first communication part has been established.

7. The control method according to claim 6, further comprising:

an input step of inputting a first control instruction; and an instruction transmission step of transmitting the first control instruction input in the input step and a second control instruction received from the portable terminal in the second communication step to the electronic musical instrument in the first communication step.

8. The control method according to claim 7, wherein the first control instruction is an instruction using a MIDI standard control change message, and wherein the second control instruction is an instruction using a MIDI standard system exclusive message.

9. The control method according to claim 6, wherein, in the first communication step, the wireless communication is performed on the basis of the Bluetooth (registered trademark) Low Energy standard.

10. The control method according to claim 6, wherein the control device is a pedal device.

11. A control system comprising:

an electronic musical instrument;

a portable terminal that controls the electronic musical instrument; and a control device connected to the electronic musical instrument and the portable terminal via wireless communication, and relays control information transmitted from the portable terminal to the electronic musical instrument in order to control the electronic musical instrument, wherein the control device includes a first communication part that performs wireless communication between the control device and the electronic musical instrument; and a second communication part that performs wireless communication between the control device and the portable terminal on the basis of the Bluetooth (registered trademark) Low Energy standard, and wherein in establishment of the wireless communication between the control device and the electronic musical instrument, the second communication part transmits an advertising packet to which an ID for identifying the control device is added to the portable terminal in a case where the wireless communication between the control device and the electronic musical instrument using the first communication part has not been established, and the second communication part transmits an advertising packet to which an ID for identifying the control device including information indicating that the wireless communication between the control device and the electronic musical instrument has been established is added to the portable terminal in a case where the wireless communication between the control device and the electronic musical instrument using the first communication part has been established.

12. The control system according to claim 11, wherein the portable terminal includes a transmission part that transmits a second control instruction to the control device, and wherein the control device further includes an input part that inputs a first control instruction, and an instruction transmission part that transmits the first control instruction input by the input part and a second control instruction received from the portable terminal via the second communication part to the electronic musical instrument via the first communication part.

13. The control system according to claim 12, wherein the first control instruction is an instruction using a MIDI standard control change message, and wherein the second control instruction is an instruction using a MIDI standard system exclusive message.

14. The control system according to claim 11, wherein the first communication part performs the wireless communication on the basis of the Bluetooth (registered trademark) Low Energy standard.

* * * * *